United States Patent
Cady et al.

(10) Patent No.: US 11,756,014 B2
(45) Date of Patent: Sep. 12, 2023

(54) SYSTEMS AND METHODS FOR MOBILE DEVICE-ENABLED CARDLESS CASH WITHDRAWALS

(71) Applicant: Fiserv, Inc., Brookfield, WI (US)

(72) Inventors: Daneen Elaine Cady, West Chicago, IL (US); Kevin Gilbert, Mukwonago, WI (US)

(73) Assignee: Fiserv, Inc., Brookfield, WI (US)

( * ) Notice: Subject to any disclaimer, the term of this patent is extended or adjusted under 35 U.S.C. 154(b) by 221 days.

(21) Appl. No.: 17/354,528

(22) Filed: Jun. 22, 2021

(65) Prior Publication Data
US 2021/0319417 A1    Oct. 14, 2021

Related U.S. Application Data

(63) Continuation of application No. 16/020,714, filed on Jun. 27, 2018, now Pat. No. 11,074,561.
(Continued)

(51) Int. Cl.
G06Q 20/02       (2012.01)
G06Q 20/10       (2012.01)
(Continued)

(52) U.S. Cl.
CPC ..... *G06Q 20/1085* (2013.01); *G06Q 20/3221* (2013.01); *G06Q 20/3223* (2013.01);
(Continued)

(58) Field of Classification Search
None
See application file for complete search history.

(56) References Cited

U.S. PATENT DOCUMENTS 5,239,583 A      8/1993    Parrillo
7,392,388 B2 *   6/2008    Keech ............... G06Q 20/04
                                                    713/168
(Continued)

FOREIGN PATENT DOCUMENTS

CA        2865798 A1      3/2015

OTHER PUBLICATIONS

Canadian Intellectual Property Office, Examination Report for Canadian Patent Application No. 3,010,055, dated Apr. 29, 2019, 4 pages, Canada.
(Continued)

*Primary Examiner* — Namrata Boveja
*Assistant Examiner* — Amit Patel
(74) *Attorney, Agent, or Firm* — ALSTON & BIRD LLP

(57) ABSTRACT

Various embodiments are directed to systems and methods enabling cardless cash withdrawals from ATMs and/or other funds dispensing system. In various embodiments, a finite-duration access code is generated and associated with an account from which funds are to be withdrawn in response to a validated request generated at a mobile app operating on a user's mobile computing device. The access code is provided to the user (e.g., via the mobile app), who can then provide the finite-duration access code and an associated PIN to the funds dispensing system. The funds dispensing system transmits the received access code and/or PIN to servers to validate the request. The servers compare the transmitted data against stored data associated with the user's account, and generates a verification response to be transmitted to the funds dispensing system upon verification. The funds dispensing system then provides the requested cash to the user.

21 Claims, 15 Drawing Sheets

Related U.S. Application Data

(60) Provisional application No. 62/525,827, filed on Jun. 28, 2017.

(51) Int. Cl.
*G06Q 20/36* (2012.01)
*G07F 19/00* (2006.01)
*H04L 9/32* (2006.01)
*G06Q 40/02* (2023.01)
*G06Q 20/32* (2012.01)
*H04L 9/08* (2006.01)

(52) U.S. Cl.
CPC ......... *G06Q 20/3674* (2013.01); *G06Q 40/02* (2013.01); *G07F 19/203* (2013.01); *H04L 9/0872* (2013.01); *H04L 9/3228* (2013.01)

(56) References Cited

U.S. PATENT DOCUMENTS

| | | | |
|---|---|---|---|
| 8,632,000 | B2 | 1/2014 | Laracey |
| 8,881,977 | B1 | 11/2014 | Paczkowski et al. |
| 8,972,297 | B2 | 3/2015 | Kay et al. |
| 9,098,846 | B2 | 8/2015 | Gill et al. |
| 9,401,077 | B2 | 7/2016 | Laracey |
| 9,536,240 | B2 * | 1/2017 | Raja ............... G07F 19/203 |
| 2011/0238573 | A1 | 9/2011 | Varadarajan |
| 2015/0095239 | A1 | 4/2015 | Specogna et al. |
| 2015/0095240 | A1 | 4/2015 | Specogna et al. |
| 2016/0189123 | A1 | 6/2016 | Lucia et al. |
| 2016/0260094 | A1 | 9/2016 | Jia |

OTHER PUBLICATIONS

Cardless Transactions, U.S. Appl. No. 62/305,642, filed Mar. 9, 2016, Inventor Kevin Gilbert, Assignee Fiserv, Inc.
FIS Global, FIS Cardless Cash, Mobile Banking at the ATM, Copyright 2017, 3 pages, http://www.fisglobal.com/solutions/digital/-/media/FISGlobal/Files/Product-Sheet/FIS-Cardless-Cash-Access.pdf, Sep. 29, 2018.
iBeacon, Getting Started with iBeacon—Apple Developer, Version 1.0, Jun. 2, 2014, 11 pages, https://developer.apple.com/ibeacon/Getting-Started-with-iBeacon.pdf, Sep. 29, 2018.
Microsoft, The OSI Model's Seven Layers Defined and Functions, Last Reviewed Feb. 27, 2002, May 3, 2005 to Sep. 17, 2018, Internet Archive, 3 pages, https://web.archive.org/web/20050503083411/http://support.microsoft.com/kb/103884, Sep. 29, 2018.
Wikipedia Contributors, OSI Model, Dec. 17, 2001, Wikipedia The Free Encyclopedia, 7 pages, http://en.wikipedia.org/wiki/OSI_model, Sep. 29, 2018.
Wikipedia Contributors, Payment Card No. Sep. 4, 2002, Wikipedia The Free Encyclopedia, 4 pages, https://en.wikipedia.org/wiki/Payment_card_number, Sep. 29, 2018.
Wikipedia Contributors, Personal Identification No. Oct. 9, 2003, Wikipedia The Free Encyclopedia, 5 pages, https://en.wikipedia.org/wiki/Personal_identification_number, Sep. 29, 2018.

* cited by examiner

| Index Number | Index Number (Binary) | Access Code |
|---|---|---|
| 0000000000 | 0 0 0 0 0 0 0 0 0 0 0 0 0 0 0 0 0 0 0 0 0 0 0 0 0 0 0 0 0 0 0 0 | 0000000000 |
| 0000000001 | 0 0 0 0 0 0 0 0 0 0 0 0 0 0 0 0 0 0 0 0 0 0 0 0 0 0 0 0 0 0 0 1 | 2147483648 |
| 0000131071 | 0 0 0 0 0 0 0 0 0 0 0 0 0 0 0 1 1 1 1 1 1 1 1 1 1 1 1 1 1 1 1 1 | 4286578943 |
| 4286578943 | 1 1 1 1 1 1 1 1 0 0 0 0 0 0 0 0 0 0 0 0 0 0 0 0 1 1 1 1 1 1 1 1 | 4027578383 |
| 4027578383 | 1 1 1 1 0 0 0 0 0 0 0 0 1 1 1 1 1 1 1 1 0 0 0 0 0 0 0 0 1 1 1 1 | 3284386787 |
| 0004194303 | 0 0 0 0 0 0 0 0 0 0 1 1 1 1 1 1 1 1 1 1 1 1 1 1 1 1 1 1 1 1 1 1 | 4292872191 |
| 4292872191 | 1 1 1 1 1 1 1 1 1 1 0 0 0 0 0 0 0 0 0 0 1 1 1 1 1 1 1 1 1 1 1 1 | 4229954591 |
| 4229954591 | 1 1 1 1 1 0 0 0 0 0 1 1 1 1 1 1 1 1 1 1 0 0 0 0 0 1 1 1 1 1 1 1 | 3890734051 |
| 0008388607 | 0 0 0 0 0 0 0 0 0 1 1 1 1 1 1 1 1 1 1 1 1 1 1 1 1 1 1 1 1 1 1 1 | 4293920767 |
| 4293920767 | 1 1 1 1 1 1 1 1 1 1 1 0 0 0 0 0 0 0 0 0 1 1 1 1 1 1 1 1 1 1 1 1 | 4232051743 |
| 4232051743 | 1 1 1 1 1 0 0 0 0 1 1 1 1 1 1 1 1 1 1 1 0 0 0 0 0 1 1 1 1 1 1 1 | 3890735075 |
| 0016777215 | 0 0 0 0 0 0 0 0 1 1 1 1 1 1 1 1 1 1 1 1 1 1 1 1 1 1 1 1 1 1 1 1 | 4293922815 |
| 4293922815 | 1 1 1 1 1 1 1 1 1 1 1 1 0 0 0 0 0 0 0 0 1 1 1 1 1 1 1 1 1 1 1 1 | 4232051775 |
| 4232051775 | 1 1 1 1 1 0 0 0 0 1 1 1 1 1 1 1 1 1 1 1 1 0 0 0 0 1 1 1 1 1 1 1 | 3890735079 |
| 0033554431 | 0 0 0 0 0 0 0 1 1 1 1 1 1 1 1 1 1 1 1 1 1 1 1 1 1 1 1 1 1 1 1 1 | 4294447103 |
| 4294451199 | 1 1 1 1 1 1 1 1 1 1 1 1 1 0 0 0 0 0 0 1 1 1 1 1 1 1 1 1 1 1 1 1 | 4265606719 |
| 4265606719 | 1 1 1 1 1 1 0 0 0 1 1 1 1 1 1 1 1 1 1 1 1 0 0 0 0 1 1 1 1 1 1 1 | 3890739191 |
| 0067108863 | 0 0 0 0 0 1 1 1 1 1 1 1 1 1 1 1 1 1 1 1 1 1 1 1 1 1 1 1 1 1 1 1 | 4294451199 |
| 4294451199 | 1 1 1 1 1 1 1 1 1 1 1 1 1 0 0 0 0 0 0 1 1 1 1 1 1 1 1 1 1 1 1 1 | 4265606719 |
| 4265606719 | 1 1 1 1 1 1 0 0 0 1 1 1 1 1 1 1 1 1 1 1 1 0 0 0 0 1 1 1 1 1 1 1 | 3890739191 |
| 0134217727 | 0 0 0 0 1 1 1 1 1 1 1 1 1 1 1 1 1 1 1 1 1 1 1 1 1 1 1 1 1 1 1 1 | 4294713343 |
| 4294713343 | 1 1 1 1 1 1 1 1 1 1 1 1 1 1 0 0 0 0 0 1 1 1 1 1 1 1 1 1 1 1 1 1 | 4269801023 |
| 4269801023 | 1 1 1 1 1 1 0 0 1 1 1 1 1 1 1 1 1 1 1 1 1 0 0 0 1 1 1 1 1 1 1 1 | 3891787767 |
| 0268435455 | 0 0 0 1 1 1 1 1 1 1 1 1 1 1 1 1 1 1 1 1 1 1 1 1 1 1 1 1 1 1 1 1 | 4294721535 |
| 4294721535 | 1 1 1 1 1 1 1 1 1 1 1 1 1 1 0 0 0 0 1 1 1 1 1 1 1 1 1 1 1 1 1 1 | 4269801087 |
| 4269801087 | 1 1 1 1 1 1 0 0 1 1 1 1 1 1 1 1 1 1 1 1 1 0 0 1 1 1 1 1 1 1 1 1 | 4160223223 |
| 4160223223 | 1 1 1 1 0 1 1 1 1 1 1 0 1 1 1 1 1 1 0 1 1 1 1 1 1 1 0 1 1 1 1 1 | 4294958557 |
| 4294958557 | 1 1 1 1 1 1 1 1 1 1 1 1 1 1 1 1 1 1 0 1 1 1 0 1 1 1 0 1 1 1 0 1 | 4294967210 |
| 4294967210 | 1 1 1 1 1 1 1 1 1 1 1 1 1 1 1 1 1 1 1 1 1 1 1 1 1 0 1 0 1 0 1 0 | 0268435455 |
| 0536870911 | 0 0 1 1 1 1 1 1 1 1 1 1 1 1 1 1 1 1 1 1 1 1 1 1 1 1 1 1 1 1 1 1 | 4294852607 |
| 4294852607 | 1 1 1 1 1 1 1 1 1 1 1 1 1 1 1 0 0 0 1 1 1 1 1 1 1 1 1 1 1 1 1 1 | 4269801343 |
| 4269801343 | 1 1 1 1 1 1 0 0 1 1 1 1 1 1 1 1 1 1 1 1 1 1 0 1 1 1 1 1 1 1 1 1 | 4294440951 |
| 4294440951 | 1 1 1 1 1 1 1 1 1 1 1 1 1 0 1 1 1 1 1 1 0 1 1 1 1 1 1 0 1 1 1 1 | 4294966749 |
| 4294966749 | 1 1 1 1 1 1 1 1 1 1 1 1 1 1 1 1 1 1 1 0 1 1 0 1 1 1 0 1 1 1 0 1 | 4294967274 |
| 4294967274 | 1 1 1 1 1 1 1 1 1 1 1 1 1 1 1 1 1 1 1 1 1 1 1 1 1 0 1 0 1 0 1 0 | 0536870911 |
| 0999999999 | 0 0 1 1 1 0 1 1 1 0 0 1 1 0 1 0 1 1 0 0 1 0 0 1 1 1 1 1 1 1 1 1 | 4180310959 |
| 4180310959 | 1 1 1 1 1 0 0 1 0 0 1 0 1 0 0 1 1 1 1 0 1 1 1 0 1 0 1 1 1 1 1 1 | 3406555007 |
| 1000000000 | 0 0 1 1 1 0 1 1 1 0 0 1 1 0 1 0 1 1 0 0 1 0 1 0 0 0 0 0 0 0 0 0 | 0019561392 |
| 1000000001 | 0 0 1 1 1 0 1 1 1 0 0 1 1 0 1 0 1 1 0 0 1 0 1 0 0 0 0 0 0 0 0 1 | 2167045040 |

FIG. 10

SYSTEMS AND METHODS FOR MOBILE DEVICE-ENABLED CARDLESS CASH WITHDRAWALS

CROSS-REFERENCE TO RELATED APPLICATIONS

This application is a continuation of U.S. application Ser. No. 16/020,714, filed Jun. 27, 2018, which claims priority to U.S. Provisional Application No. 62/525,827 filed Jun. 28, 2017, both of which are incorporated herein by reference in their entirety.

BACKGROUND

At present, Automated Teller Machines (ATMs) provide a great deal of security against potentially unauthorized or fraudulent access to cash contained therein. These machines include many physical security devices to protect against forced entry into the interior of machine, including security cameras and strong locking mechanisms. ATMs generally include robust software security as well, to prevent against forced, unauthorized access into individual customers' accounts through hacking and/or tampering with the machine. However, the security measures of these machines provides certain limitations on authorized user access as well—authorized users have historically needed a physical ATM card and an associated access PIN to present to the ATM in order to access their account and withdraw funds from the ATM). This has also created a potential security vulnerability for some users as well, since certain users may write their PIN number on the ATM card itself to avoid forgetting the PIN number.

Accordingly, there exists a need for mechanisms enabling banking customers to access funds from their banking accounts without requiring a physical ATM card while maintaining a high degree of security to prevent unauthorized access to those funds.

BRIEF SUMMARY

Various embodiments are directed to system and methods enabling users to access and withdraw cash from an account held at an institution, using finite duration access codes in lieu of physical account access cards (e.g., debit cards). These access codes may be generated specifically for a particular individual, and transmitted to a mobile device (operating a mobile app) operated by the user, such that the user can present the received access codes to a funds dispensing system (e.g., an ATM or a POS operated by an employee) to obtain a requested quantity of cash withdrawn from the user's account.

Certain embodiments are directed to a computer-implemented method for enabling user-based access to an electronic account associated with an institution via finite-duration access codes. In certain embodiments, the method comprises: receiving, via one or more processors associated with an application server, an access code request associated with a user using a mobile app on a mobile device, wherein the access code request comprises institution identifying data, user identifying data, and an electronic account selection; retrieving, from a memory accessible by the application server, a virtual Personal Account Number (v-PAN) for the user based at least in part on the institution identifying data and the user identifying data; generating, via the one or more processors, an access code by: pseudo-randomly generating a value based at least in part on an increasing index value stored in association with the application server, wherein the index value increases after each pseudo-randomly generated value is generated; identifying, based on a leading digit of the pseudo-randomly generated value, a selected BIN value having length X; replacing the leading digit of the pseudo-randomly generated value with the selected BIN value to generate an intermediate value; and calculating a check digit and concatenating the check digit to the intermediate value to generate the access code, wherein the access code is valid for a defined finite duration; storing at least a portion of the access code and a timestamp associated with the defined finite duration of the access code in association with the v-PAN via the memory; and transmitting data indicative of the access code for presentation to the user via the mobile app on the mobile device associated with the user.

Moreover, the user-based access to the electronic account may enable cash withdrawal from the electronic account via a funds dispensing system. In certain embodiments, the electronic account corresponds to a financial account. In certain embodiments, the access code request further comprises an account identifier identifying the electronic account for cash withdrawal. Moreover, in various embodiments the funds dispensing system is selected from: an ATM system or a merchant/Point-of-Sale system.

In certain embodiments, the access code is a 16-digit access code and wherein the selected BIN value has a 6-digit length, and wherein generating an access code further comprises: replacing the selected BIN value with the leading digit of the pseudo-randomly generated value to create an 11-digit access code consisting of the pseudo-randomly generated value and the check digit; and wherein transmitting data indicative of the access code for presentation to the user via the mobile app on the mobile device associated with the user comprises transmitting the 11-digit access code for presentation to the user via the mobile app on the mobile device associated with the user. Moreover, various embodiments comprise steps for determining a PIN and associated PIN offset for use with the access code, wherein determining the PIN and associated PIN offset comprises: receiving a PIN and corresponding PIN offset associated with the v-PAN; or calculating a PIN offset and corresponding PIN based at least in part on the access code. Moreover, the PIN may be calculated at least in part by: determining a PIN key corresponding to the BIN value; encrypting the access code using the PIN key to generate a natural PIN having length Y; generating a second random sequence of digits having length <=Y; generating a PIN having length Y, wherein the PIN comprises the second random sequence of digits; calculating a PIN offset as the modulo 10 difference between the natural PIN and the PIN.

In certain embodiments, the method comprises steps for processing an account access request associated with the generated access code, wherein processing the account access request comprises: receiving an account access request generated at a funds dispensing system, wherein the account access request comprises the data indicative of the access code; querying a database of stored access codes to validate the account access request; and upon validating the account access request, transmitting a validation message to the funds dispensing system. Moreover, the account access request may further comprise a withdrawal amount, and wherein validating the account access request may comprise determining whether the withdrawal amount included in the account access request matches a stored validated withdrawal amount associated with the access code. In certain embodiments, validating the account access request comprises determining whether access code has expired based at least in part on the stored timestamp. In various embodiments, validating the account access request comprises: transmitting an authorization request to an authorization server in communication with an issuer server associated with the institution; and receiving an authorization response indicating that the issuer server authorized the user-based access to the electronic account. Moreover, the account access request may further comprise a PIN, and wherein validating the account access request may comprise: transmitting a PIN validation request to an authorization server for verification of the PIN included in the account access request; and receiving a PIN validation response indicating whether the PIN included in the account access request is valid. In certain embodiments, retrieving the v-PAN comprises querying a separate sever to identify a v-PAN matching at least one element of the access code request.

Various embodiments are directed to a system for enabling user-based access to an electronic account associated with an institution via finite-duration access codes. In certain embodiments, the system comprises one or more memory storage areas; and one or more processors. The processors may be collectively configured to: receive an access code request associated with a user using a mobile app on a mobile device, wherein the access code request comprises institution identifying data, user identifying data, and an electronic account selection; retrieve, from the memory storage area, a virtual Personal Account Number (v-PAN) for the user based at least in part on the institution identifying data and the user identifying data; generate an access code by: pseudo-randomly generating a value based at least in part on an increasing index value stored in association with the application server, wherein the index value increases after each pseudo-randomly generated value is generated; identifying, based on a leading digit of the pseudo-randomly generated value, a selected BIN value having length X; replacing the leading digit of the pseudo-randomly generated value with the selected BIN value to generate an intermediate value; and calculating a check digit and concatenating the check digit to the intermediate value to generate the access code, wherein the access code is valid for a defined finite duration; store at least a portion of the access code and a timestamp determinative of the defined finite duration of the access code in association with the v-PAN via the memory; and transmit data indicative of the access code for presentation to the user via the mobile app on the mobile device associated with the user.

In certain embodiments, the user-based access to the electronic account enables cash withdrawal from the electronic account via a funds dispensing system. Moreover, the electronic account may correspond to a financial account. In certain embodiments, the access code request further comprises an account identifier identifying the electronic account for cash withdrawal. Moreover, the funds dispensing system is selected from: an ATM system or a merchant/Point-of-Sale system.

In various embodiments, the access code is a 16-digit access code and wherein the selected BIN value has a 6-digit length, and wherein generating an access code further comprises: replacing the selected BIN value with the leading digit of the pseudo-randomly generated value to create an 11-digit access code consisting of the pseudo-randomly generated value and the check digit; and wherein transmitting data indicative of the access code for presentation to the user via the mobile app on the mobile device associated with the user comprises transmitting the 11-digit access code for presentation to the user via the mobile app on the mobile device associated with the user. The processors may be further configured to determine a PIN and associated PIN offset for use with the access code, wherein determining the PIN and associated PIN offset comprises: receiving a PIN and corresponding PIN offset associated with the v-PAN; or calculating a PIN and corresponding PIN offset based at least in part on the pseudo-random access code. In various embodiments, the PIN may be calculated and generated at least in part by: determining a PIN key corresponding to the BIN value; encrypting the access code using the PIN key to generate a natural PIN having length Y; generating a second random sequence of digits having length $<=Y$; generating a PIN having length Y, wherein the PIN comprises the second random sequence of digits; calculating a PIN offset as the modulo 10 difference between the natural PIN and the PIN.

Moreover, the processors may be further configured to process an account access request associated with the generated access code, wherein processing the account access request comprises: receiving an account access request generated at a funds dispensing system, wherein the account access request comprises an access code; querying a database of stored access codes to validate the account access request; and upon validating the account access request, transmitting a validation message to the funds dispensing system.

In certain embodiments, the account access request further comprises a withdrawal amount, and wherein validating the account access request comprises determining whether the withdrawal amount included in the account access request matches a stored validated withdrawal amount associated with the access code. Moreover, validating the account access request may comprise determining whether the access code has expired based at least in part on the stored timestamp. Moreover, validating the account access request may comprise: transmitting an authorization request to an authorization server in communication with an issuer server associated with the institution; and receiving an authorization response indicating that the issuer server authorized the user-based access to the electronic account. The account access request of various embodiments further comprises a PIN, and wherein validating the account access request comprises: transmitting a PIN validation request to an authorization server for verification of the PIN included in the account access request; and receiving a PIN validation response indicating whether the PIN included in the account access request is valid. Moreover, retrieving the v-PAN comprises querying a separate sever to identify a v-PAN matching the access code request.

Certain embodiments are directed to a computer program product comprising at least one non-transitory computer-readable storage medium having computer-executable program code portions stored therein, the computer-executable program code portions comprising program code instructions, the computer program code instructions, when executed by a processor of a first computing entity, are configured to cause the first computing entity to at least: receive an access code request associated with a user using a mobile app on a mobile device, wherein the access code request comprises institution identifying data, user identifying data, and an electronic account selection; retrieve, from the memory storage area, a virtual Personal Account Number (v-PAN) for the user based at least in part on the institution identifying data and the user identifying data; generate an access code by: pseudo-randomly generating a value based at least in part on an increasing index value stored in association with the application server, wherein the index value increases after each pseudo-randomly generated value is generated; identifying, based on a leading digit of the pseudo-randomly generated value, a selected BIN value having length X; replacing the leading digit of the pseudo-randomly generated value with the selected BIN value to generate an intermediate value; and calculating a check digit and concatenating the check digit to the intermediate value to generate the access code, wherein the access code is valid for a defined finite duration; store at least a portion of the access code and a timestamp determinative of the defined finite duration of the access code in association with the v-PAN via the memory; and transmit data indicative of the access code for presentation to the user via the mobile app on the mobile device associated with the user.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
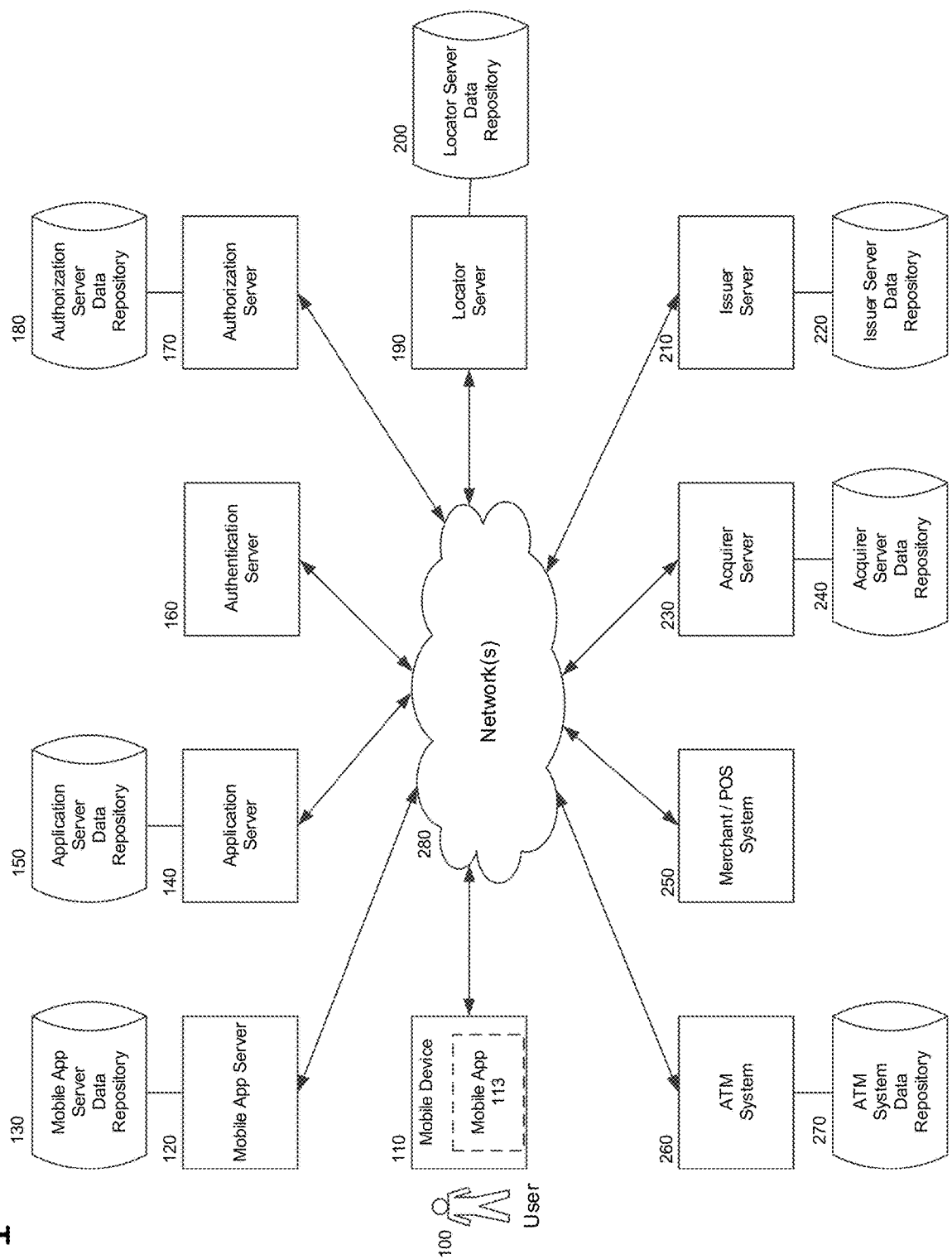
FIG. 1 is an overview of a system that can be used to practice embodiments of the present invention.

FIG. 10 provides example results of a pseudo-random access code generation algorithm based on various index values.

FIGS. 11-15 are example screenshots of a mobile app providing various functionalities as discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. And terms are used both in the singular and plural forms interchangeably. Like numbers refer to like elements throughout.

I. Overview

Various embodiments are directed to mechanisms enabling "cardless" transactions for users to access funds within an associated financial account. Users are enabled to utilize a mobile device (e.g., a smart phone) to initiate algorithms for generating a short-lived access code (and a randomly-generated PIN to be utilized with the access code, if applicable) that is made available to the user via a user interface of the mobile device. The short-lived access code is associated with the user's financial account, such that the user may provide this access code for use by a funds dispensing system (e.g., an ATM, a POS (point-of-sale) configured as discussed herein, and/or the like) to perform one or more transactions associated with the user's account (e.g., withdrawing cash). Moreover, the access codes may comprise an access-code level BIN, a pseudo-randomly generated portion, and a check digit, which collectively form a number having a length analogous to the length of a debit card number, thereby enabling the access codes to be utilized by systems (e.g., ATMs) configured for operating with traditional debit cards. The BIN of the access code may be compressed, or otherwise represented by a single digit mapped to a multi-digit access code BIN to enable consumers to retrieve and utilize shorter duration access codes when accessing a funds dispensing system.

To enable the user's mobile device to obtain and present usable access codes, the mobile device performs a registration process in association with one or more server systems (e.g., a mobile app server in connection, either directly or indirectly with an application server, an authorization server and/or an issuer server) and in response to various user inputs received via the mobile device. The registration process may comprise steps for receiving user input (via the mobile app operating on the mobile device) for accepting various terms of service for usage of the access codes. Completion of the registration process enables a user's mobile device to generate access code requests, which in turn enables the user's mobile device to obtain and present usable access codes for the user.

Once the registration process is complete, the user may request an access code via the mobile device to be utilized to perform one or more transactions via his/her account (e.g., withdraw cash from the account). The initial request for an access code, as generated at the mobile device, may include data specifying the amount of cash requested for withdrawal and may be sent from the mobile device to a mobile app server, which passes the request along to an application server. The application server may then retrieve a long-term virtual Primary Account Number (v-PAN) associated with the user from an authorization server and generate an access code (e.g., via a pseudo-random access code generation algorithm), which may be associated with one or more financial institution accounts (e.g., checking account, savings account, and/or the like), which have account number designations of their own that are not revealed by the v-PAN. When ultimately presented to a funds dispensing system, the access code may be utilized together with a PIN (e.g., an existing PIN also usable with a user's debit card, a generated PIN for use exclusively with one or more access codes, and/or the like). Thus, the application server may additionally generate a PIN to be utilized in association with the access code and/or to generate a PIN offset utilized to associate an existing PIN (e.g., a PIN associated with the user's debit card) with the access code. Both the access code and PIN or PIN offset may be stored in association with the user's v-PAN, the amount to be withdrawn from the user's account, a validity time period for the access code and/or other identifying information that may be utilized by the application server to verify a later-in-time withdrawal request provided via a funds dispensing system (e.g., an ATM or POS).

Those withdrawal requests may be processed in association with any of a variety funds dispensing systems, and the user may present a generated access code and verification information (e.g., a PIN, or in certain embodiments, a photo identification used to validate the user's identity) for use by the funds dispensing system, which then transmits the received information to the application server (e.g., via an acquirer server). The application server verifies the existence of the access code, the validity of the access code (e.g., whether the access code has expired), the validity of a provided PIN (if applicable), the validity of the requested withdrawal amount, and/or other identifying information usable to verify the withdrawal request, and provides a response to the funds dispensing system indicating whether the withdrawal is valid for processing. Upon receipt of an approval, the funds dispensing system fulfills the withdrawal request, and the user's account is debited for the withdrawal.

II. Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution). The terms software, computer program product, and similar words may be used herein interchangeably.

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media/memory).

In one embodiment, a non-volatile computer-readable storage medium may include a floppy disk, flexible disk, hard disk, solid-state storage (SSS) (e.g., a solid state drive (SSD), solid state card (SSC), or solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-recordable (CD-R), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1 provides an illustration of an exemplary embodiment of the present invention. As shown in FIG. 1, this particular embodiment may include one or more mobile app users 100, one or more mobile devices 110 (executing one or more mobile apps 113), one or more mobile app servers 120 (that include or are in communication with one or more mobile app server data repositories 130 accessible, directly or indirectly via one or more additional servers (e.g., banking institution-specific servers), to the mobile app servers 120), one or more application servers 140 (that include or are in communication with one or more application data repositories 150), one or more authentication servers 160, one or more authorization servers 170 (that include or are in communication with one or more authorization server data repositories 180), one or more locator servers 190 (that include or are in communication with one or more locator server data repositories 200), one or more issuer servers 210 (that include or are in communication with one or more issuer server data repositories 220), one or more acquirer servers 230 (that include or are in communication with one or more acquirer server data repositories 240), one or more merchant point of sale (POS) systems 250, one or more ATM systems 260 (that include or are in communication with one or more ATM system data repositories 270), one or more networks 280, and/or the like. In certain embodiments, various of these entities may be compliant with one or more industry, regulatory, and/or legal standards for data storage of user's account information/data. For example, various of the included servers may be Payment Card Industry Data Security Standard (PCI DSS) compliant for storage of account information within associated data repositories. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

Mobile App Server

Figure 2:
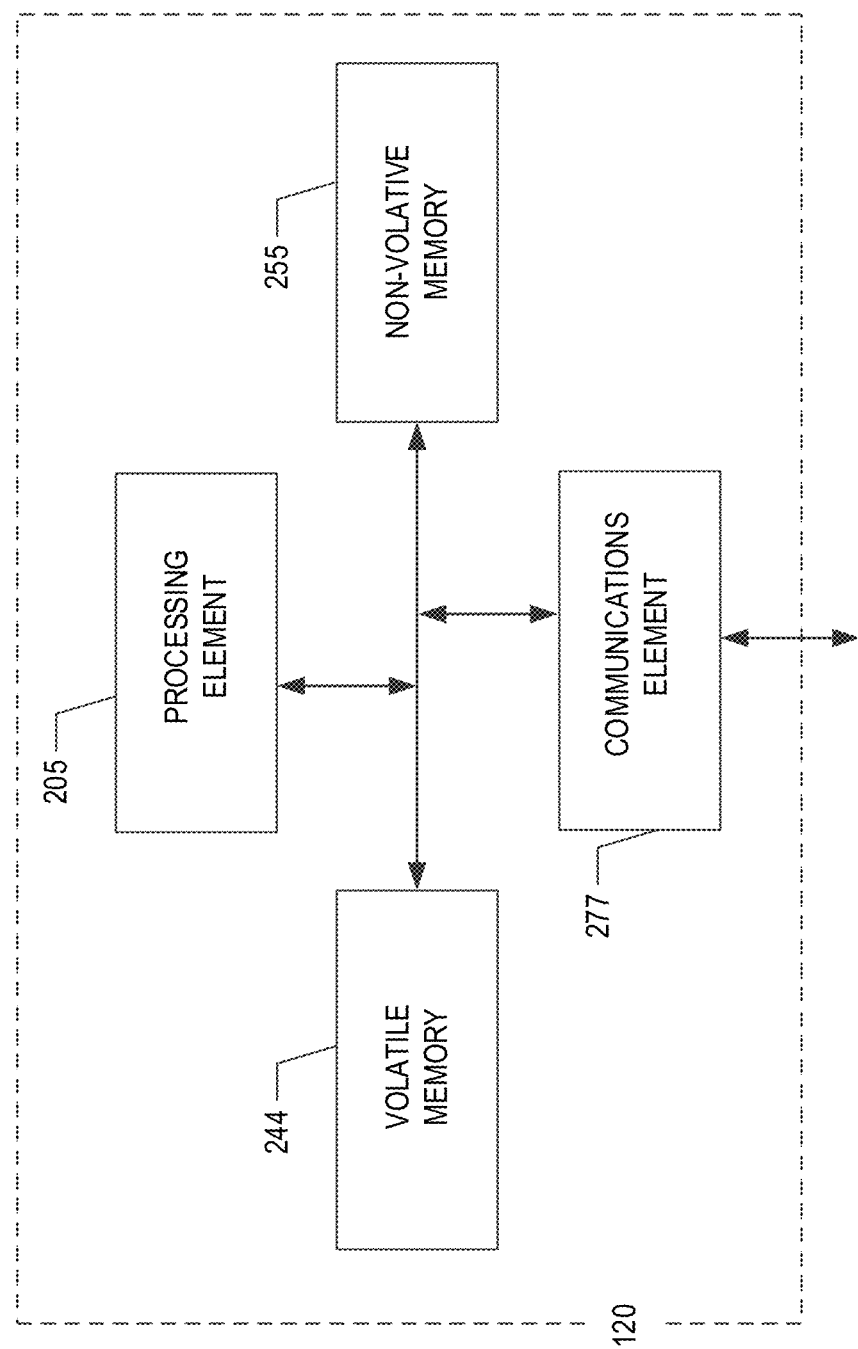
FIG. 2 is an exemplary schematic diagram of a server according to one embodiment of the present invention.

FIG. 2 provides a schematic of mobile app server 120 according to one embodiment of the present invention. In one embodiment, the mobile app server 120 may be coupled with a mobile app 113 executing on a mobile device 110 and may perform some functionality (e.g., maintaining selected user data in persistent local storage, retrieving user data from persistent local storage as necessary, interacting with one or more other servers across one or more networks, or performing "heavy" processing) that is more appropriately performed at a server than in a lightweight, potentially less secure, mobile app 113 that is focused on user interaction. In certain embodiments, the mobile app server 120 may be operable in association with other computing devices and/or platforms (e.g., operable via third parties, such as financial institutions' online banking platforms) to accomplish certain functions (e.g., user authentication) to retrieve certain data (e.g., an authenticated user's financial account numbers), and/or the like. In general, the terms computing entity, computer, entity, device, system, server, machine, and/or similar words used herein interchangeably may refer to, for example, one or more computers, computing entities, desktop computers, mobile phones, tablets, phablets, notebooks, laptops, distributed systems, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, controlling, remotely controlling, dispensing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As shown in FIG. 1, in one embodiment, the mobile app server 120 may be in communication with one or more mobile app server data repositories 130. Furthermore, as shown in FIG. 2, the mobile app server 120 may include one or more processing elements 205 (also referred to as processors, processing circuitry, processing device, and/or similar terms used herein interchangeably) that communicate with other elements within the mobile app server 120 via a bus, for example. The mobile app server data repositories 130 may maintain a wide variety of data accessible to the mobile app server 120, such as user-specific items (e.g., user (login) ID, password (or other authentication credential(s)), mobile device identifier (e.g., phone number), one or more account number(s), user name, user registration status, and/or the like). As will be understood, the processing element 205 may be embodied in a number of different ways. For example, the processing element 205 may be embodied as one or more complex programmable logic devices (CPLDs), "cloud" processors, microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media/memory or otherwise accessible to the processing element 205. As such, whether configured by hardware or computer program products, or by a combination thereof, the processing element 205 may be capable of performing steps or operations according to embodiments of the present invention when configured accordingly.

In one embodiment, the mobile app server 120 may further include or be in communication with non-volatile media/memory (also referred to as non-volatile storage, memory, memory storage, memory circuitry and/or similar terms used herein interchangeably). In one embodiment, the non-volatile storage or memory may include one or more non-volatile storage or memory media 255, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the mobile app server 120 may further include or be in communication with volatile media/memory (also referred to as volatile storage, memory, memory storage, memory circuitry and/or similar terms used herein interchangeably). In one embodiment, the volatile storage or memory may also include one or more volatile storage or memory media 244, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the mobile app server 120 with the assistance of the processing element 205 and operating system.

As indicated, in one embodiment, the mobile app server 120 may also include one or more communications elements/interfaces 277 for communicating with various computing entities, such as by communicating data, content, information, and/or similar terms used herein interchangeably that can be transmitted, received, operated on, processed, displayed, stored, and/or the like. For instance, the mobile app server 120 may communicate with one or more mobile apps 113 executing on one or more mobile devices 110, one or more authorization servers 170, one or more authentication servers 160, one or more application servers 140, one or more issuer servers 210, one or more acquirer servers 230, one or more ATM systems 260, one or more transmitters 190, one or more networks 280, and/or the like.

Communication enabled by the one or more communications elements/interfaces 277 may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the mobile app server 120 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The mobile app server 120 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Although not shown, the mobile app server 120 may include or be in communication with one or more input elements, such as a keyboard input, a mouse input, a touch screen/display input, motion input, movement input, audio input, pointing device input, joystick input, keypad input, and/or the like. In one embodiment, the mobile app server 120 may also include or be in communication with one or more output elements (not shown), such as audio output, video output, screen/display output, motion output, movement output, printer, and/or the like.

As will be appreciated, one or more of the mobile app server's 120 components may be located remotely from other mobile app server 120 components, such as in a distributed system. Furthermore, one or more of the components may be combined and additional components performing functions described herein may be included in the mobile app server 120. Thus, the mobile app server 120 can be adapted to accommodate a variety of needs and circumstances. As will be recognized, these architectures and descriptions are provided for exemplary purposes only and are not limiting to the various embodiments.

In one embodiment, with such components, the mobile app server(s) 120 can be tightly coupled with the mobile app 113 executing on mobile device 110 and perform some functionality of the mobile app 113 (e.g., authentication/authorization, persistent data storage (e.g., storage of mobile user 100 profile information, including the actual account numbers in the wallet), interaction with other servers, information/data retrieval, meatier processing) that may be best done apart from the mobile device 110. In one embodiment, the mobile app server(s) 120 interact with the application server(s) 140 to trigger functionality within other servers. As will be recognized, the mobile app server(s) 120 can support and perform a variety of other functions, processes, operations, and/or similar words used herein interchangeably.

Similarly, the mobile app server 120 may maintain a wide variety of data in its mobile app server data repository 130, such as user (login) ID (unique identifier for the mobile app user 100 within the mobile app system), password (or other authentication credential(s)), mobile device identifier (e.g., phone #), link ID (unique identifier for the mobile app user 100 within the issuer server 210), one or more account numbers (for the user's account(s) at the issuer that are associated with the v-PAN, user-established nickname(s) for the account(s) (for display/selection in the mobile app 113 of the mobile device 110), and cardless cash solution (CCS) registration status.

Exemplary Mobile Device

In one embodiment, a mobile app user 100 may be an individual, a representative of a company or organization, and/or the like who wants to withdraw cash from one of the accounts under her control via an ATM system 260. In the described context, a mobile app user 100 may be someone who wants to withdraw cash from one of his or her accounts via an ATM system 260 or a merchant POS system 250 (e.g., both may be referred to interchangeably as a funds dispensing system). The user 100 may interact with both a mobile app 113 on a mobile device 110 and an ATM system 260 or a Merchant/POS system 250 (in the latter case, the user 100 may interact with a merchant/POS employee using the Merchant/POS system 250). As will be recognized, an account may be any of a number of different account types, including a debit card account, a checking account, a savings account, a money market account, a credit card account, and/or the like. Accounts may be associated with any of a variety of institutions, such as banks, credit unions and/or non-financial institutions (e.g., insurance payment providers, reward account servicers, and/or the like). Moreover, an account could be associated with more than one user 100 (e.g., a husband and wife that each have access to a common checking account), and each user may have access to the account via different access numbers (e.g., different debit card numbers), or in certain embodiments each user may have access to the account via an identical access number. In other embodiments, a single user's access number (e.g., debit card number) may be associated with more than one account (e.g., a checking account, a savings account). In one embodiment, a mobile app user 100 may operate a mobile device 110 executing a mobile app 113 (the mobile app 113, the mobile device 110, and the two together may be referred to herein interchangeably). In certain embodiments, the mobile app 113 (e.g., in combination with mobile app server 120) is configured to perform application-specific processing in response to user input from the user 100 provided via a user interface (and leveraging native operating system facilities of the mobile device 110 and/or interacting with other system components and/or tools stored locally on the mobile device 110 and/or accessed via one or more networks) to register a user, setup default parameters (e.g., preferences) for cash requests for the user 100, authenticate a user 100, submit cash requests to obtain an access code and/or PIN as discussed herein, and/or request identification of nearby location(s) funds dispensing systems (e.g., merchants/POS systems 250 and/or ATMs 260). Various example user interfaces of a mobile app 113 providing functionalities as discussed herein are illustrated in FIGS. 11-15.

Figure 3:
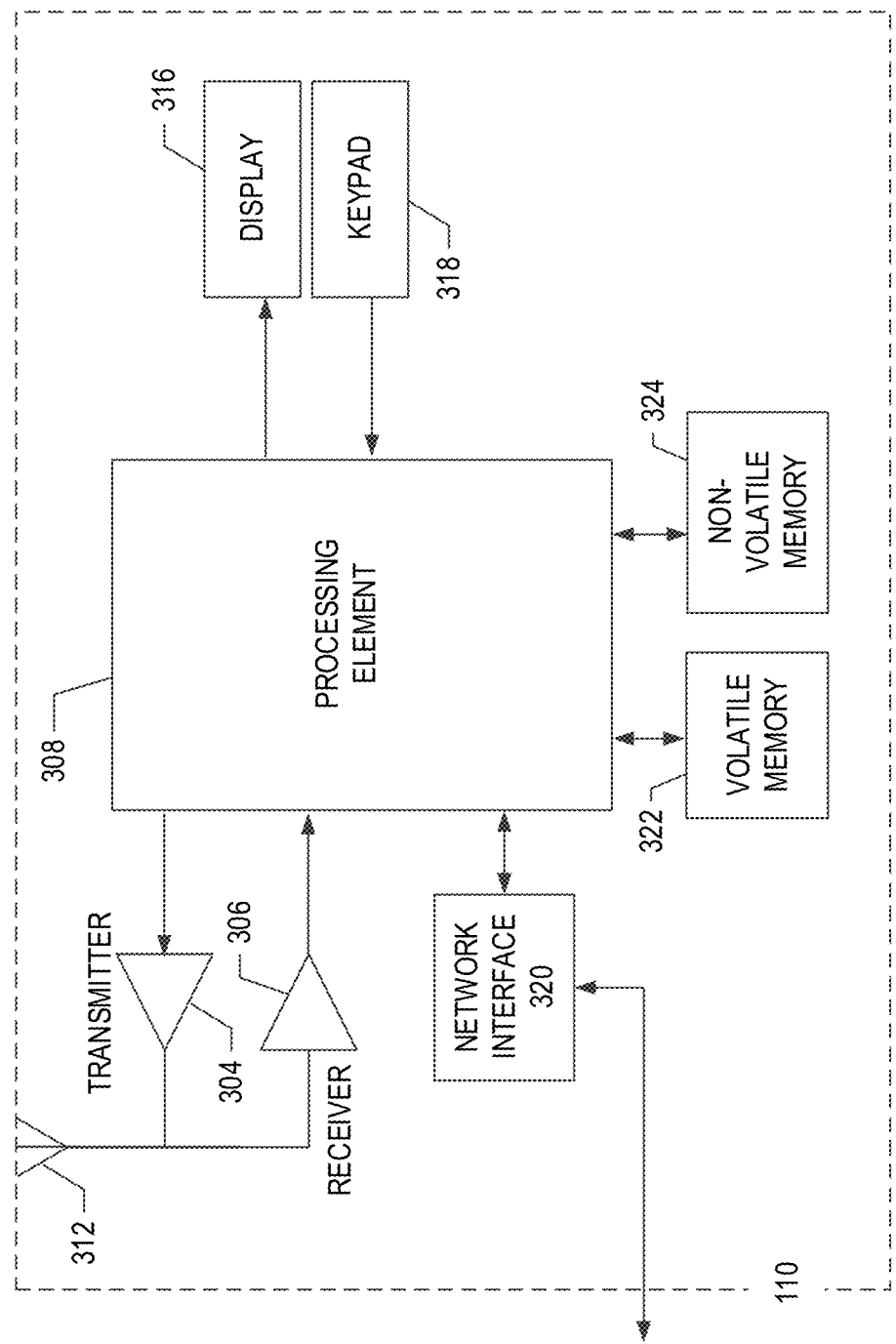
FIG. 3 is an exemplary schematic diagram of a mobile device according to one embodiment of the present invention.

The mobile device 110 includes one or more components that are functionally similar to those of the mobile app server 120. FIG. 3 provides an illustrative schematic representative of a mobile device 110 that can be used in conjunction with embodiments of the present invention. As noted previously, the terms device, system, computing entity, entity, server, and/or similar words used herein interchangeably may refer to at least, for example, one or more computers, computing entities, mobile phones, tablets, phablets, watches, glasses, ear pieces, wristbands, wearable items/devices, the like, and/or any combination of devices or entities adapted to perform the functions, operations, and/or processes described herein. As shown in FIG. 3, the mobile device 110 can include an antenna 312, a transmitter 304 (e.g., radio), a receiver 306 (e.g., radio), and a processing element 308 (e.g., CPLDs, microprocessors, multi-core processors, cloud processors, coprocessing entities, ASIPs, microcontrollers, and/or controllers) that provides signals to and receives signals from the transmitter 304 and receiver 306, respectively.

In one embodiment, the signals provided to and received from the transmitter 304 and the receiver 306, respectively, may include signaling information/data in accordance with air interface standards of applicable wireless systems. In this regard, the mobile device 110 may be capable of operating with one or more air interface standards, communication protocols, modulation types, and access types. More particularly, the mobile device 110 may operate in accordance with any of a number of wireless communication standards and protocols, such as those described above with regard to the mobile app server 120. In a particular embodiment, the mobile device 110 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the mobile device 110 may operate in accordance with multiple wired communication standards and protocols, such as those described above with regard to the mobile app server 120 via a network interface 320.

Via these communication standards and protocols, the mobile device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). In one embodiment, the mobile device 110 can also download changes, add-ons, and updates, for instance, to its firmware, software (e.g., including executable instructions, applications, program modules), and operating system.

According to one embodiment, the mobile device 110 may include location determining aspects, devices, modules, functionalities, and/or similar words used herein interchangeably. For example, the mobile device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). In one embodiment, the satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the mobile device's 110 position in connection with a variety of other systems, including cellular towers, Wi-Fi access points, and/or the like. Similarly, the mobile device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Bluetooth Smart, Wi-Fi Direct transmitters, NFC transmitters, and/or the like. These indoor positioning aspects can be used in a variety of settings to determine the location of someone or something to within inches or centimeters.

In one embodiment, the mobile device 110 may also comprise a user interface (that can include a display 316 coupled to a processing element 308) and/or a user input interface (coupled to a processing element 308). For example, the user interface may be a user application, browser, user interface, interface, and/or similar words used herein interchangeably executing on and/or accessible via the mobile device 110 to interact with and/or cause display of information/data from the mobile app server 120, as described herein. The user input interface can comprise any of a number of devices or interfaces allowing the mobile device 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the mobile device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the mobile device 110. As indicated, this may include a user application that is resident on the entity or accessible through a browser or other user interface for communicating with the mobile app server 120 and/or various other computing entities.

As will be recognized, the mobile device 110 may include one or more components or functionality that are the same or similar to those of the mobile app server 120, as described in greater detail above. As will be recognized, these architectures and descriptions are provided for exemplary purposes only and are not limiting to the various embodiments.

In one embodiment, with such components, the mobile app 113 executing on mobile device 110 can at least perform the following functions via application-specific processing interacting with the mobile app user 100 through a user interface and leveraging native operating system facilities and possibly one or more third-party tools. For instance, the mobile app 113 executing on the mobile device 110 (also referred to as the mobile app 113 or the mobile device 110 individually) supports user authentication, user registration, user set-up of default parameters (e.g., preferences) for cash requests, user submission of a cash request to obtain a short, finite-duration access code and PIN, user request for identification of a nearby location, a funding instrument wallet, and/or the like.

Exemplary Application Server

In one embodiment, an application server 140 (that includes or is in communication with one or more application data repositories 150) may include one or more components that are functionally similar to those of the mobile app server 120, the mobile device 110, and/or other described and undescribed computing entities, servers, systems, and/or the like. For example, in one embodiment, each application server 140 may include one or more processing elements (e.g., CPLDs, microprocessors, multi-core processors, cloud processors, coprocessing entities, ASIPs, microcontrollers, and/or controllers), one or more display device/input devices (e.g., including user interfaces), volatile and non-volatile storage or memory, and/or one or more communications interfaces. As will be recognized, these architectures and descriptions are provided for exemplary purposes only and are not limiting to the various embodiments. In one embodiment, the application server(s) 140 maintains CC S-related information/data and supports both mobile device-initiated cash request functionality and ATM-initiated or merchant POS system-initiated cash withdrawal functionality, interacting with other entities as necessary. Further, the application server 140 can maintain various types of information/data in the application server data repository 150—including mapping table(s) to facilitate transformation of 11-digit access codes to/from 16-digit access codes, CCS BIN/PIN key pair(s) to use for access code and PIN generation (and/or PIN offset generation for utilization of an existing PIN), user-specific v-PANs, customer name(s) (which may be utilized for customer identity validation, for example, during in-person transactions), zero or more sets of 16-digit access codes, PIN offsets, amounts (may be utilized for transaction validation if/when a user 100 provides an amount to a funds dispensing system), timestamps (to support short, finite-duration access code/PIN pairs), invalid PIN retry counts, and/or eligibility for removal indicator.

Exemplary Authentication Server

In one embodiment, an authentication server 160 may include one or more components that are functionally similar to those of the mobile app server 120, the mobile device 110, and/or other described and undescribed computing entities, servers, systems, and/or the like. For example, in one embodiment, each authentication server 160 may include one or more processing elements (e.g., CPLDs, microprocessors, multi-core processors, cloud processors, coprocessing entities, ASIPs, microcontrollers, and/or controllers), one or more display device/input devices (e.g., including user interfaces), volatile and non-volatile storage or memory, and/or one or more communications interfaces. As will be recognized, these architectures and descriptions are provided for exemplary purposes only and are not limiting to the various embodiments.

In one embodiment, the authentication server(s) 160 may assist in authenticating both an access code and a mobile app user 100 in a cash withdrawal context, interacting with one or more other servers across one or more network(s) 270 as necessary. The authentication server 160 can function as an intermediary and perform some validation processing but does not persist or access any CCS-related information/data.

Exemplary Authorization Server

In one embodiment, an authorization server 170 may include one or more components that are functionally similar to those of the mobile app server 120, the mobile device 110, and/or other described and undescribed computing entities, servers, systems, and/or the like. For example, in one embodiment, each authorization server 170 may include one or more processing elements (e.g., CPLDs, microprocessors, multi-core processors, cloud processors, coprocessing entities, ASIPs, microcontrollers, and/or controllers), one or more display device/input devices (e.g., including user interfaces), volatile and non-volatile storage or memory, and/or one or more communications interfaces. As will be recognized, these architectures and descriptions are provided for exemplary purposes only and are not limiting to the various embodiments.

In one embodiment, the authorization server(s) 170 can perform various functions—such as assigning and disseminating v-PAN BINs, maintaining an authority framework of key issuer and user data, providing user-specific information on request to the application server 140 (e.g., including v-PAN for generation of access codes and PINs, customer name(s) for subsequent cash withdrawal validation (via merchant POS system 250 and/or ATM systems 260), and/or receiving cash withdrawal requests from an acquirer server 230 (whether originated through an ATM system 260 or a merchant POS system 250). The authorization server data repositories 180 may receive authorization requests and interact with the issuer server 210 to authorize the requests (in certain embodiments these authorization requests may be presented in a manner similar to card-based transactions such that an authorization request is presented as a separate card-type transaction using a user's v-PAN separately from a cash withdrawal request, however other embodiments may utilize the authorization server to control the processing of a cash withdrawal request, while interacting with both the application server 140 and issuer server 210 as necessary to fully accomplish both validation and authorization).

Exemplary Locator Server

In one embodiment, a locator server 190 (that includes or is communication with one or more locator data repositories 200) may include one or more components that are functionally similar to those of the mobile app server 120, the mobile device 110, and/or other described and undescribed computing entities, servers, systems, and/or the like. For example, in one embodiment, each locator server 190 may include one or more processing elements (e.g., CPLDs, microprocessors, multi-core processors, cloud processors, coprocessing entities, ASIPs, microcontrollers, and/or controllers), one or more display device/input devices (e.g., including user interfaces), volatile and non-volatile storage or memory, and/or one or more communications interfaces. As will be recognized, these architectures and descriptions are provided for exemplary purposes only and are not limiting to the various embodiments.

In one embodiment, the locator server 190 supports a location-based service to provide geographically nearby CCS funds dispensing locations (whether ATMs, payment agents, POS locations, or other supported physical locations) on request. Further, the locator server 190 leverages its locator server data repository 200 which contains an authority list of geographically identified CCS funds dispensing locations (e.g., cash withdrawal access points).

Exemplary Issuer Server

In one embodiment, an issuer server 210 (that includes or is in communication with one or more issuer server data repositories 220) may include one or more components that are functionally similar to those of the mobile app server 120, the mobile device 110, and/or other described and undescribed computing entities, servers, systems, and/or the like. For example, in one embodiment, each issuer server 210 may include one or more processing elements (e.g., CPLDs, microprocessors, multi-core processors, cloud processors, coprocessing entities, ASIPs, microcontrollers, and/or controllers), one or more display device/input devices (e.g., including user interfaces), volatile and non-volatile storage or memory, and/or one or more communications interfaces. As will be recognized, these architectures and descriptions are provided for exemplary purposes only and are not limiting to the various embodiments.

In one embodiment, the issuer server(s) 210 can perform various functions. For instance, the issuer server(s) 210 can receive an assigned v-PAN BIN and add it to the issuer's core account processing system; generate v-PANs for all eligible customers; maintain funds and velocity limits; maintain an authority association between the following for customers receiving v-PANs: customer name(s), v-PAN, one or more account numbers associated with the v-PAN, and customer-level funds and velocity limits; transmit v-PAN BIN-level funds and velocity limits to the authorization server 170; transmit the following items of information for customers receiving v-PANS to the authorization server 170: customer name(s), v-PAN, one or more account numbers associated with the v-PAN, and customer-level fund and velocity limits; and authorize cash withdrawals based on v-PAN. Similarly, the issuer server 210 may maintain a wide variety of information/data in issuer server data repository 220, including both issuer-specific data (e.g., v-PAN BIN(s), v-PAN BIN-level amount and/or velocity limits) and user-specific data (e.g., customer name(s), v-PAN, one or more account number(s) associated with the v-PAN, customer-level amount and/or velocity limits), and/or the like.

Exemplary Acquirer Server

In one embodiment, an acquirer server 230 (that includes or is communication with one or more acquirer server data repositories 240) may include one or more components that are functionally similar to those of the mobile app server 120, the mobile device 110, and/or other described and undescribed computing entities, servers, systems, and/or the like. For example, in one embodiment, each acquirer server 230 may include one or more processing elements (e.g., CPLDs, microprocessors, multi-core processors, cloud processors, coprocessing entities, ASIPs, microcontrollers, and/or controllers), one or more display device/input devices (e.g., including user interfaces), volatile and non-volatile storage or memory, and/or one or more communications interfaces. As will be recognized, these architectures and descriptions are provided for exemplary purposes only and are not limiting to the various embodiments. In one embodiment, the acquirer server(s) 230 can facilitate the ATM system's 260 interaction with the authentication server(s) 160 (e.g., via a network 280). The acquirer server 230 is configured to receive and process card transactions from either the ATM system 260 or the merchant/POS system 250 and/or to access card networks to authorize and/or fulfill transactions. To facilitate these functions, the acquirer server data repository 240 maintains data to enable proper routing of transactions. For example, the acquirer server data repository 240 maintains an authority list of access code BINs usable to determine whether a received number is an access code for which an associated transaction should be routed to a specific authorization server 170 (e.g., via a network 280).
Exemplary Funds Dispensing System (e.g., ATM or Merchant POS System)

Referring now to other illustrative parts of the architecture, a merchant POS system 250 and/or an ATM system 260 (that includes or is communication with one or more ATM system data repositories 270) may be associated with a corresponding funds dispensing location such as, for example, an ATM, funds dispensing system, POS, and/or financial institution branch location. In one embodiment, a merchant POS system 250 and/or an ATM system 260 may include one or more funds dispensing computing entities that may support processing in connection with requests for receipt of funds and the dispensing of funds in response thereto and/or requests for financial transactions involving the purchase of goods or services, for example. The one or more funds dispensing computing entities may include computing device(s) that are local to a corresponding ATM location and/or computing device(s) that are remotely located. At least one of the funds dispensing computing entities may be configured to access and store information/data in at least one of one or more datastores to perform processing supported by the funds dispensing computing entity.

In the case of an ATM location for example, the ATM system 260 associated therewith may include a machine that includes a reader or scanner configured to receive input (e.g., information/data) encoded in the magnetic stripe of a payment or funds access card, a barcode, a Quick Response (QR) Code, and/or the like. The machine may be further or alternatively configured to receive input from a mobile app user 100 via one or more user interfaces such as, for example, a physical keypad, a virtual keypad, wireless protocols (e.g., NFC) and/or the like. For example, the machine may be configured to receive user input of an 11-digit access code to access a locally stored mapping table to expand the received 11-digit access code into a 16-digit access code processable by the ATM system 260, as discussed herein. The ATM machine may be configured to perform various financial account-related tasks based on received input such as accepting deposits, dispensing cash, displaying account details, and/or the like.

In one embodiment, the merchant POS system 250 and/or the ATM system 260 may be configured to transmit information/data to one or more other funds dispensing computing entities located at the location and/or one or more funds dispensing computing entities located remotely from the location. In other example embodiments, a financial institution teller or other individual may provide input indicative of the same to a local funds dispensing computing entity (e.g., a client application executing on a local computer) and/or to a remote funds dispensing computing entity via, for example, a Web-based application, a thin-client application, a mobile application, and/or the like.

Such local funds dispensing computing entities and/or remote dispensing computing entities may be configured to perform processing by accessing information/data stored in one or more of the datastore(s) such as, for example, information/data indicative of past transactional activity, information/data indicative of past transactional activity generally associated with the financial account, and/or the like. In one or more other example embodiments, local funds dispensing computing entities and/or remote funds dispensing computing entities may communicate one or more requests to one or more other systems of the architecture of FIG. 1 to perform processing.

In any of the above scenarios, responses may be communicated to a merchant POS system 250, ATM system 260, and/or a computing device operable by a financial institution teller. The responses may be used to authorize the dispensing of funds to the mobile app user 100. If at least one condition is deemed not satisfied, the response may indicate a denial of access to funds. If access to funds is denied, the response may specify a reason for the denial which may be presented to the mobile app user 100 in the form of a transaction decline message. It should be appreciated that, even in those instances in which the dispensing of funds is authorized, the mobile app user 100 may cancel the transaction thereby resulting in no funds being disbursed.

In those example embodiments in which cash is dispensed to a mobile app user 100 based on a request for funds made or a purchase transaction is executed, a request to debit a financial account may be submitted for transmission (e.g., from an application server 140) and instruction of an appropriate entity to debit the financial account. In other example embodiments, a charge may be applied to a credit card account. Such debit or charge requests may be combined or may be caused by authorization requests (e.g., an authorization request may comprise an explicit, separately defined debit and/or charge request and/or an authorization request may inherently be treated as both an authorization request and a debit/charge request when received at an authorization server). As will be recognized, a variety of other approaches and techniques can be used to adapt to various needs and circumstances.

Exemplary Networks

In one embodiment, any two or more of the illustrative components of the architecture of FIG. 1 may be configured to communicate with one another via respective communicative couplings to one or more networks 280. The networks 280 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 280 may have any suitable communication range associated therewith and may include, for example, global networks (e.g., the Internet), metropolitan area networks (MANs), wide area networks (WANs), local area networks (LANs), or personal area networks. In addition, the networks 280 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Transmissions over networks 280 may be "in the clear" or may leverage one of more of a variety of industry-standard or third-party security technologies implemented in any of the Open Systems Interconnection (OSI) model layers used (e.g., a physical layer, a network layer, and/or the like). If encryption is used, it may be symmetric or asymmetric (or implement a combination of the two, as in SSL/TLS, where the initial handshake uses asymmetric encryption in the exchange of symmetric keys, and subsequent transactions use symmetric encryption based on the previously exchanged symmetric keys). As will be recognized, inter-process communication over a network may be synchronous or asynchronous: synchronous—processes are coupled and include web services (e.g., SOAP), which may in turn leverage http(s); and various other remote procedure call (RPC), middleware protocols, industry-standard exchange formats (e.g., XML or JSON), and integration architectures (e.g., REST) and/or asynchronous—processes are decoupled and mechanisms include message queues and file transfers.

IV. Exemplary System Operation

Reference will now be made to FIGS. 4-9. These figures are flowcharts illustrating steps, operations, and processes that can be used in accordance with various embodiments of the present invention.

As previously noted, the mobile device-enabled cardless cash solution (also referred to as CCS) is an innovative offering that provides a solution to technical problems existing in prior systems that required a user to use or be tied to a physical card PAN. CCS provides a technical solution to these problems by leveraging a number of closely collaborating components that are necessarily rooted in the world of mobile devices 110 and mobile apps 113. Furthermore, embodiments of this invention are further rooted in the use of funds dispensing systems (e.g., ATM systems 260 and/or merchant POS systems 250). Despite being rooted in both of these worlds, it should be noted that there is no direct communication between a mobile app 113/mobile device 110 and either an ATM system 260 or a merchant POS system 250. Additionally, CCS supports emergency cash access as well as everyday cash withdrawal in one seamless solution.

Issuer Boarding

Operations and steps for one embodiment of issuer boarding for CCS are described below and shown in FIG. 4.

To begin the issuer boarding process, the authorization server 170 assigns (it may receive the assignment from another platform or human being) a v-PAN BIN for a particular issuer that must now be set up ("boarded") to participate in CCS. The v-PAN BIN assigned to a particular issuer may be selected from a plurality of predefined and/or otherwise available v-PAN BINs. The v-PAN BINs of various embodiments may be assigned to new issuers on an exclusive basis, such that a particular v-PAN BIN may be utilized with only a single issuer, or a non-exclusive basis, such that a particular v-PAN BIN may be utilized in association with a plurality of issuers. In the latter embodiments, a particular issuer may be associated with a range of available v-PANs and one of the v-PAN BINs, thereby enabling differentiation between issuers assigned to a common v-PAN BIN. For a particular new issuer, the authorization server 170 stores the v-PAN BIN in its authorization server data repository 180, which contains an authority set of the v-PAN BINs for all issuers participating in CCS.

Additionally, the debit network can associate the v-PAN BIN (and/or range of v-PANs associated with a particular issuer) with optional issuer-defined amounts/funds and velocity limits that are universal for the issuer, not customer-specific. These values may be entered by a debit network associate based on prior interaction with the issuer, or this data may be received in an electronic transmission and automatically processed and stored (either prior to all steps 403-422 of FIG. 4, or possibly as late as step/operation 406 of FIG. 4 (as further content supplemental to the customer-specific information). However received, this may be performed and stored on another platform (not shown in the diagram) within the debit network processing system, although for the purpose of this embodiment, it is depicted as being stored in the authorization server data repository 180. The authorization server 170 transmits the v-PAN BIN to the issuer server 210 in certain embodiments, as reflected at step/operation 402.

In one embodiment, the issuer server 210 sets up the received v-PAN BIN on the issuer's core account processing system (may be on other platforms, not shown in the diagram). Then, the issuer server 210 generates v-PANs for all eligible customers, in accordance with its own eligibility rules. As discussed above, the generated v-PANs for a particular issuer may be within a defined range of available v-PANs, thereby enabling the issuer server 210 to distinguish between v-PANs associated with different issuers.

As shown at step/operation 403, the issuer server 210 may establish v-PAN (customer)-specific amount/funds and velocity limits that may supplement or supersede the universal amount/funds and velocity limits that apply at the v-PAN BIN level. Finally, the issuer server 210 establishes an association between the following items in its issuer server data repository 220: Customer name(s), vPAN(s), one or more account numbers associated with the vPAN, one or more account types associated with each account number, and/or customer level amount/fund and/or velocity limits. The issuer server 210 may transmit a v-PAN BIN receipt confirmation response to the authorization server 170 in certain embodiments as shown at step/operation 404.

As shown at step/operation 405, for newly set-up customers (e.g., issuers), the issuer server 210 can extract a set of CCS-relevant customer information from its issuer server data repository 220 for transmission to the authorization server 170. The particular items to be transmitted include the following for each customer: customer name(s), v-PAN(s), one or more account numbers associated with the v-PAN, one or more account types associated with each account number, and/or customer-level amount/fund and/or velocity limits. Moreover, the issuer server 210 may include optional v-PAN BIN-level amount/funds and velocity limits in this set of information to be transmitted (although this not customer-specific), or it may transmit such issuer-specific information separately. In one embodiment, the issuer server 210 transmits the set of CCS-relevant customer information to the authorization server 170, as shown at step/operation 406.

In one embodiment, the authorization server 170 stores the received set of CCS-relevant customer information in its authorization server data repository 180, using the v-PAN as the key to add or replace information, as shown at step/operation 407. In one embodiment, the authorization server 170 transmits a CCS customer information receipt confirmation response to the issuer server 210, as shown at step/operation 408. Such steps may be repeated as a plurality of new customers are added and/or as information associated with one or more customers is updated.

User Registration

Figure 4:
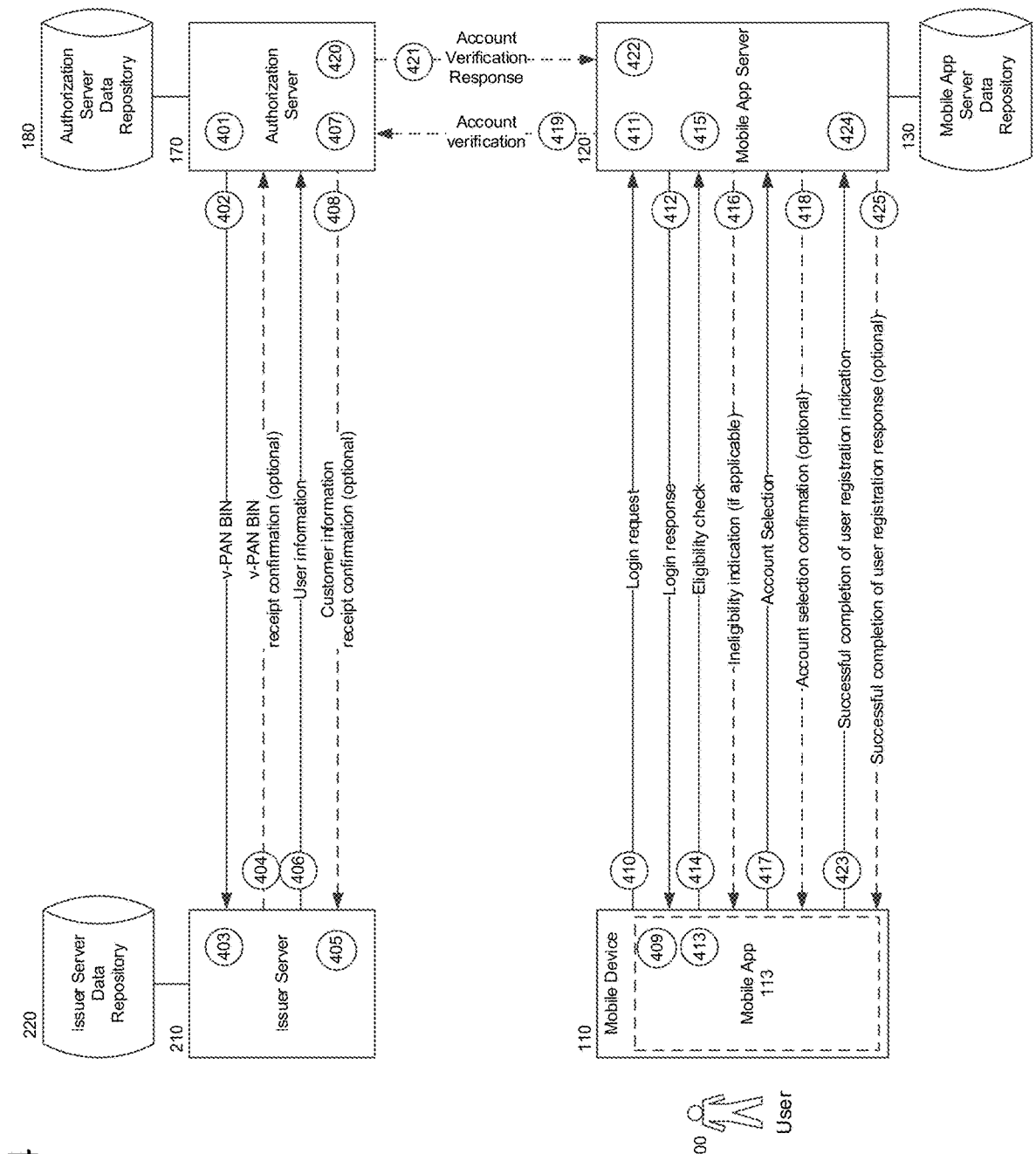
FIGS. 4-9 are flowcharts illustrating steps, operations, and processes that can be used in accordance with various embodiments of the present invention.

FIG. 4 also illustrates various steps/operations involved in a user registration process. In one embodiment, the mobile app user 100 launches the mobile app 113 and enters login credentials (typically a user (login) ID and password) to begin the process, as indicated at step/operation 409. The mobile app 113 may be specific to the cardless transaction system processing, or the mobile app 113 may be associated with an issuer (e.g., a financial institution's mobile banking app, a merchant's shopping/rewards app, an insurance provider's account app, and/or the like).

As shown at step/operation 410, the mobile app 113 transmits a login request containing the login credentials to the mobile app server 120, and the mobile app server 120 may then validate the received login credentials using authority information in its mobile app server data repository 130 as shown at step/operation 411.

In one embodiment, the mobile app server 120 transmits a login response reflecting the results of the validation in step/operation 412 to the mobile app 113. Assuming the login is validated, the login response may include a number of user-specific data items for the mobile app 113 to store in and reference from transient storage during the course of a use session beginning upon validation of the login credentials.

Assuming the login is validated, the mobile app 113 displays a home screen of information and user-selectable options to the mobile app user 100 as shown at step/operation 413. The displayed information may include issuer specific and/or user specific information, such as account balance details (e.g., financial institution account balance details, merchant reward point balance details, reward availability details, and/or the like), account setting details, advertisements provided by the issuer, and/or the like.

Either on the home screen or on one or more further screens accessible to the user upon selection of available interactive user interface elements, for example, the mobile app 113 presents user-selectable options for 1) user registration for CCS, 2) cash request, 3) cash request preferences establishment, and/or 4) nearby CCS-capable locations identification (the latter three of which may be initially unavailable until user registration for CCS has been successfully completed). In one embodiment, the mobile app 113 receives a selection of the user registration for CCS option from the mobile app user 100. Appropriate terms and conditions are displayed (or referenced), and the mobile app 113 receives approval or other indication of reading/accepting the terms and conditions, enabling use of the CCS service (i.e., making the cash request, cash request preferences establishment, and nearby CCS-capable locations identification options available). It should be understood that the terms and conditions may be displayed (or referenced) at a later time during the user registration process in certain embodiments.

In certain embodiments, upon receipt of user input selecting the "user registration for CCS" option displayed via the user interface, the mobile app 113 may be configured to provide the login credentials (provided during initial login to the mobile app 113) to the mobile app server 120 to verify the identity of the user and to check the user's eligibility for CCS related actions, as indicated at 414. Alternatively, the mobile app 113 may provide user identifying information to the mobile app server 120, or may otherwise provide an identity verification confirmation, indicating that the user's identity was previously verified with the original app login process discussed herein. The mobile application server 120 may perform an eligibility check as indicated at 415 to determine whether the user is eligible for using the CCS services (this may be performed prior to displaying or referencing the terms and conditions in certain embodiments). Upon determining that the user is eligible, the registration process may continue. Upon determining that the user is not eligible, the mobile application server 120 may provide data to the mobile app 113 operating on the mobile device 110 indicating that the user is ineligible for the CCS-related actions as indicated at 416, which causes the mobile app 113 to display an information message and may terminate the user registration process. In yet other embodiments, the user eligibility check may be performed in the background of the mobile app 113 (e.g., simultaneously with the initial login process and/or otherwise before displaying the home screen of the mobile app 113), and accordingly the display provided to the user may omit any CCS-related actions (e.g., registration or use interactive buttons) for those users found to be ineligible for the CCS methodologies.

As a part of the registration process, the mobile app 113 may provide the mobile app server 120 with one or more identifiers, such as account identifiers (e.g., account numbers) and/or other identifiers for the user to associate various user accounts with the ability to utilize the CCS methodology. The identifiers may comprise an account number alone, or the identifiers may comprise a combination of account numbers and/or other identifiers (e.g., a user name) to uniquely identify a particular user in embodiments in which multiple users may have access to a single account. The mobile app 113 may provide users with options for selecting a subset or all of their accounts for use with the CCS methodology, and the mobile app 113 may then assemble account identifiers (e.g., account numbers) associated with the selected accounts with other identifiers (if applicable) to be provided to the mobile application server 120 to complete the registration process, as indicated at step/operation 417. Alternatively, the mobile app 113 may simply utilize a default selection of all or some subset of the accounts associated with the user to provide to the mobile app server 120, or the mobile app server 120 may default to a selection of one or more user accounts without receipt of instructions from the mobile app 113. The mobile app server 120 may provide a confirmation of the selected accounts back to the mobile app 113 in certain embodiments, as indicated at step/operation 418. As shown at step/operation 419, the mobile app server 120 may transmit the account selections to the authorization server 170 for verification of the user's accounts and/or to otherwise associate the user's accounts with an established v-PAN for the user, as indicated at step/operation 420. Upon verification of the user's accounts and/or linking of the accounts to the user's v-PAN for future CCS methodology usage, the authorization server 170 may provide a response to the mobile app server 120, as indicated at step/operation 421. The mobile app server 120 may then store the identifier (e.g., account number(s) and user name) in the mobile app server data repository 130 for later usage for user verification purposes as indicated at 422.

In one embodiment, the mobile app 113 transmits a successful completion of CCS registration indication to the mobile app server 120 at step/operation 423. In one embodiment, the mobile app server 120 sets the CCS registration status associated with the user (login) ID in its mobile app server data repository 130 to reflect the successful completion of CCS registration, to ensure the CCS user does not have to go through this process again (the status could be reset if, for example, the CCS user may be required to review and approve new terms and conditions) as shown at step/operation 424. In one embodiment, the mobile app server 120 transmits a successful completion of CCS registration indication response to the mobile app 113, as shown at step/operation 425.

Cash Request for Access Code & PIN

Figure 5:
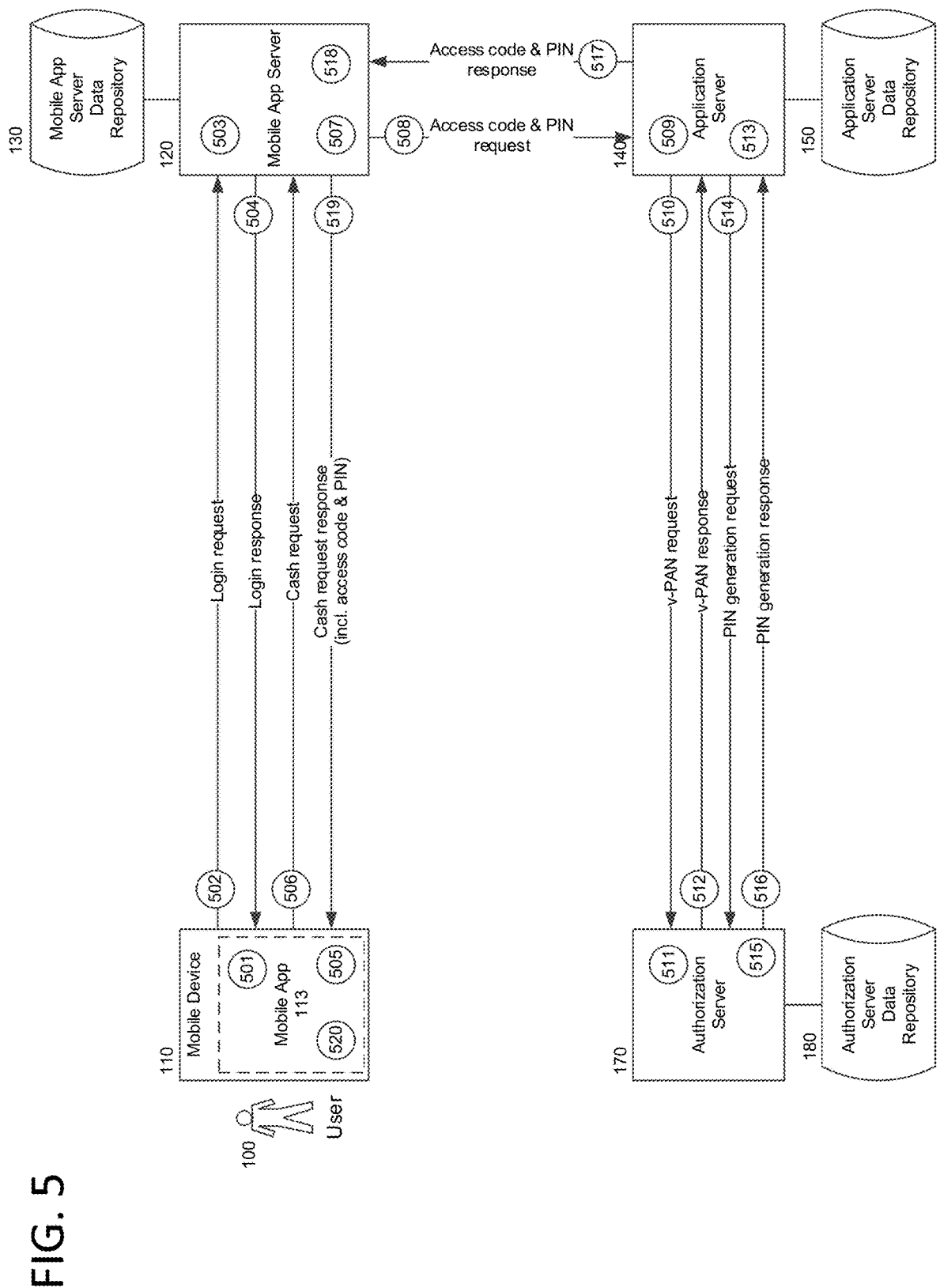

Operations and steps for one embodiment of a cash request for access code and optionally a PIN are described below and shown in FIGS. 5, 8, and 10. In one embodiment, the mobile app user 100 launches the mobile app 113 and enters login credentials (typically a user (login) ID and password (or other credentials)), as shown at step/operation 501 via a log-in screen, such as that shown in FIG. 11. The mobile app 113 may then transmit a login request containing the entered login credentials to the mobile app server 120 as shown at step/operation 502. The mobile app server 120 validates the received login credentials, using authority information in its mobile app server data repository 130 as shown at step/operation 503. The mobile app server 120 may then transmit a login response reflecting the results of a validation process to the mobile app 113 as shown at step/operation 504. Assuming the login is validated, the login response may include a number of user-specific data items for the mobile app 113 to store in and reference from transient storage during the course of the session. If the login is not validated, an error message may be returned to the user.

Figure 13:
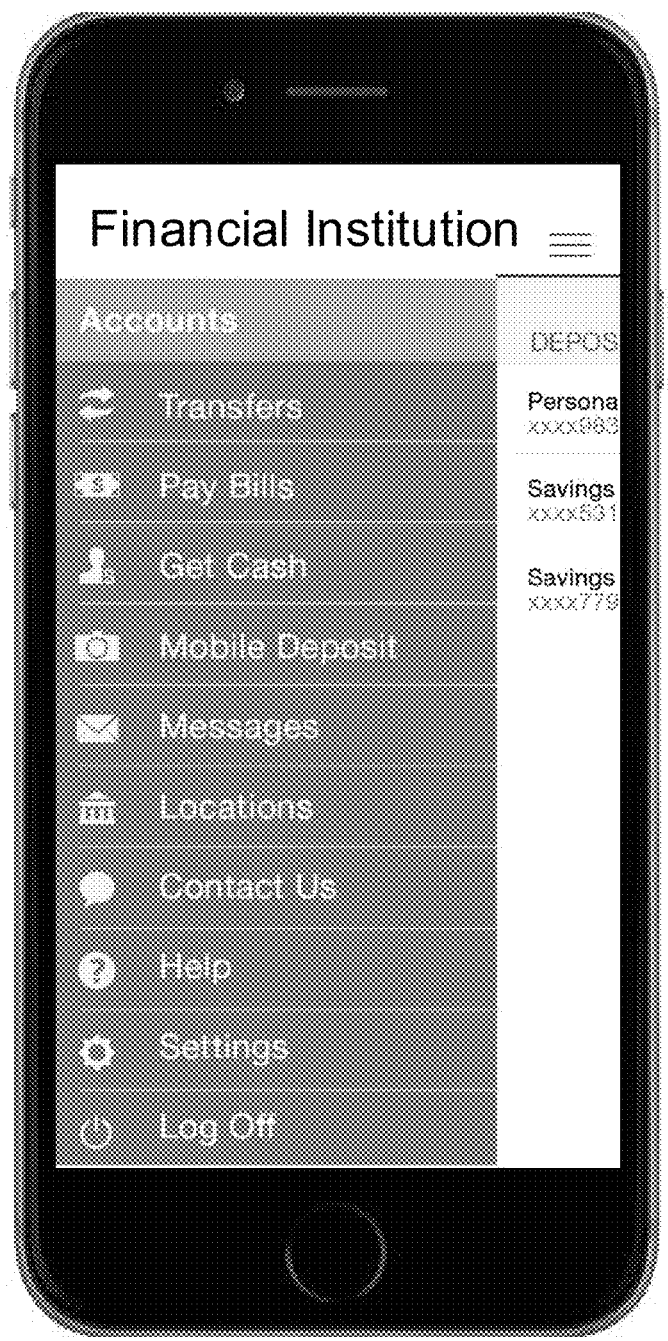

Assuming the login is validated, the mobile app 113 displays a home screen of information (e.g., as shown in the example screenshot of FIG. 12) and user-selectable options to the mobile app user 100 as shown at step/operation 505, and as shown in the example screenshot of FIG. 13. Either on the home screen or on one or more further screens, as shown in FIG. 13 for example, the mobile app 113 presents user-selectable options for 1) user registration for CCS (possibly hidden or grayed out, assuming this function has already been completed), 2) cash request, 3) cash request preferences establishment, and 4) nearby CCS-capable locations identification. In one embodiment, the mobile app 113 receives a selection of the cash request option from the mobile app user 100.

Figure 14:
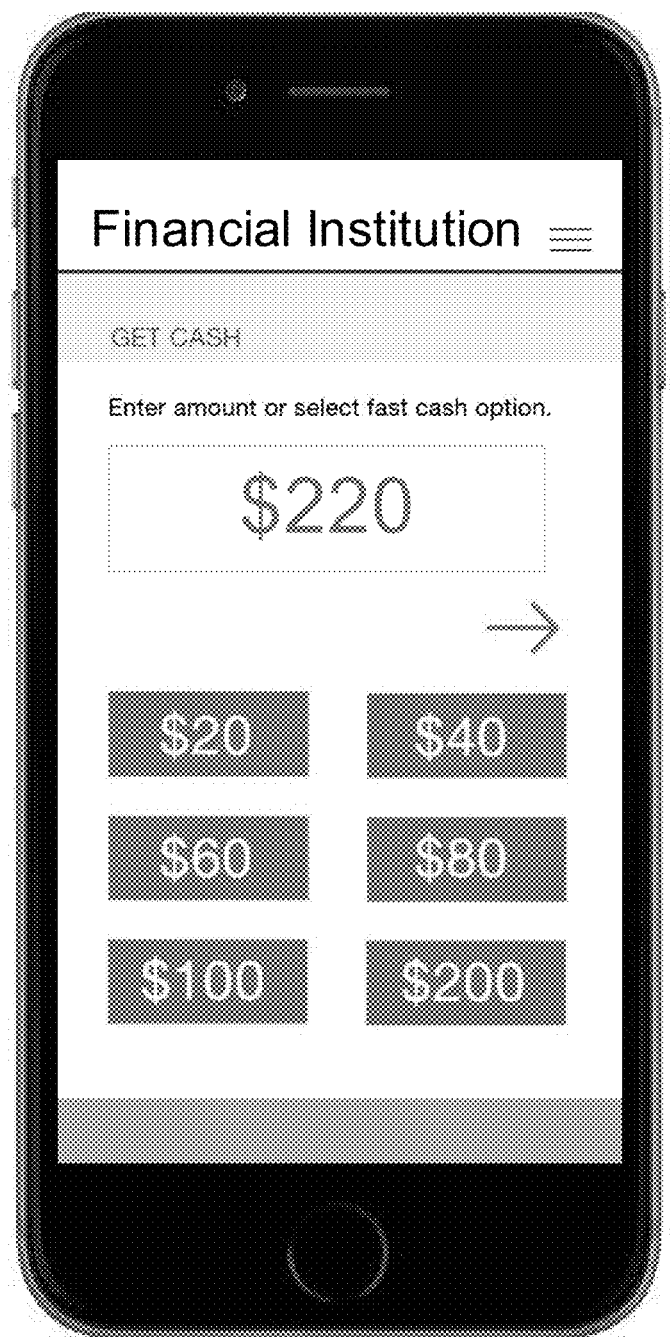
Figure 15:
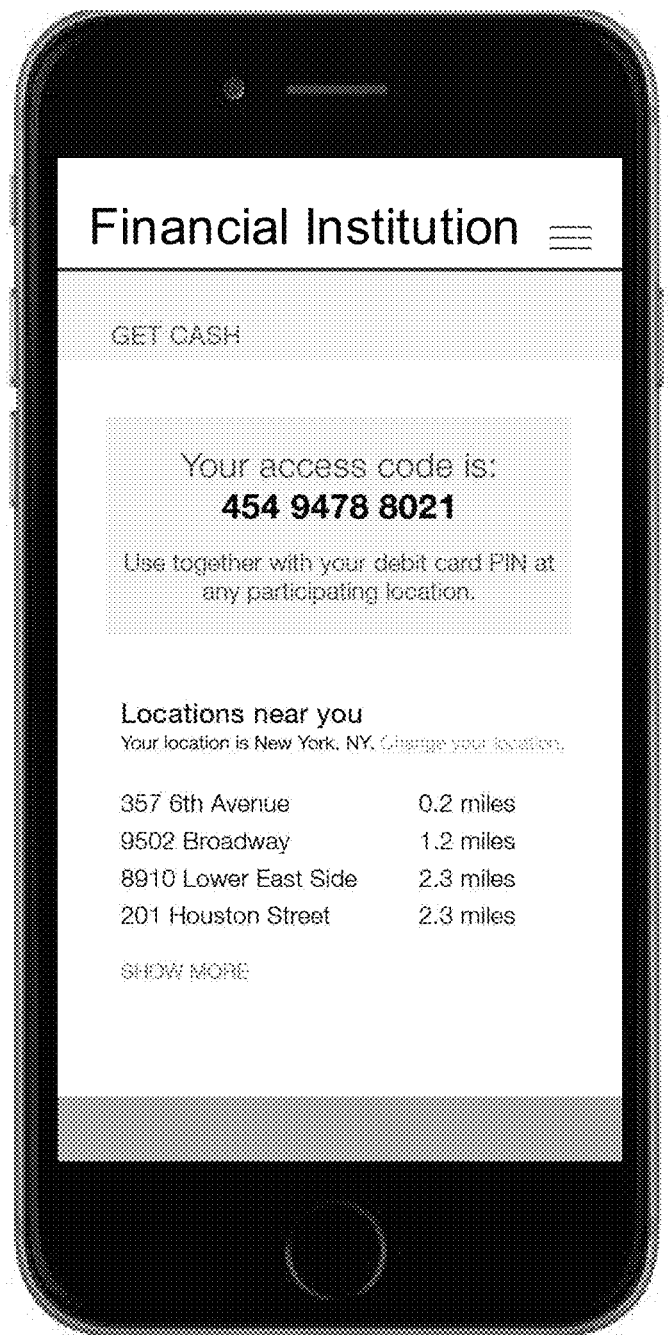

In one embodiment, the mobile app 113 displays a cash request screen to the mobile app user 100, prompting for 1) an account (selectable from the user's accounts associated with the v-PAN) (Alternatively, the user may select the cash request option after selecting a particular account; it all depends on how the user interaction is designed) and/or 2) an amount (e.g., as shown in the example screenshot of FIG. 14). These fields may be pre-populated with system defaults or user preferences, which may be overridden. Accounts may be identified in a variety of ways that eliminate ambiguity, including 1) by an account type (e.g., checking, savings) and optionally some subset of the particular account number (e.g., last 4 digits), 2) by a nickname assigned by the mobile app user 100, or 3) (least preferable) by the full account number. In one embodiment, the mobile app user 100 identifies a particular account and an amount and selects a "submit" option (note that selection of the "submit" option may be all that is necessary if defaults are presented and acceptable), and the mobile app 113 constructs a cash request containing these values.

In one embodiment, the mobile app 113 transmits the cash request to the mobile app server 120 as shown at step/operation 506. In one embodiment, the mobile app server 120 constructs an access code & PIN request which contains data from the cash request (amount) and data associated with the mobile app user 100 from its mobile app server data repository 130 (full account number and/or user name corresponding to how the account was identified in the cash request) as shown at step/operation 507. This may presuppose that the combination of these two values is unique and unambiguous across debit network issuers. If that is not guaranteed to be the case, an additional value of debit network issuer identifier may be necessary, in which case it would have to be available on both the mobile app server data repository 130 and the authorization server data repository 180.

In one embodiment as reflected at step/operation 508, the mobile app server 120 transmits the access code & PIN request to the application server 140 via an API message comprising data utilized to uniquely identify the user's account and an intended amount of a withdrawal. An example dataset included in the API message is shown in Table 1, shown below.

TABLE 1

| Field | Data Type | Comment |
| --- | --- | --- |
| HTTP Header | String | May contain an identifier for the App Server endpoint |
| Authorization | String | May be utilized to authenticate the message and/or user associated with the message as sent to the application server 140 (may be authenticated in association with a third party server). |
| Request Body Begin | | |
| clientAuditId | String | An optional field that may be utilized to audit one or more messages. |
| clientId | String | Institution identifying data for which a user's account is associated (e.g., financial institution identifier). |
| originatorId | String | Identifies the source of the mobile app 113 and thereby encompasses user identifying data. |
| requestType | String | 'ACCOUNT', 'PAN', 'vPAN' (utilized to specify how a request is provided from the user) |
| requestValue | String | Based on requestType |
| accountType | String | Account Type. This field should be populated only when request type is "Account". Example Values are CK = Checking SV = Saving CC = Credit |

TABLE 1-continued

| Field | Data Type | Comment |
| --- | --- | --- |
| amount | String | Amount requested for access code may be provided in a minor currency unit, such as cents. (e.g., A value of 999999999999 in request implies $9999999999.99) (In certain embodiments, a value of zero implies it's an eligibility check request) |
| accessCodeLifeSpan | String | Lifespan of requested access code in seconds (In certain embodiments, a value of zero implies it's an eligibility check request) |
| consumerName | String | Consumer Name Where requestType = "ACCOUNT" or Debit Card, this should match the customer name on the card record where an account is tied to multiple cards to identify the requisite PIN offset. In other cases the name may be used to indicate the consumer ID credential to be used in the walk-in channel. |
| originatorReferenceId | String | (optional) Originator Reference Id indicates a value provided by the Originator for a specific user. It may be subscriber id, user id, email id, phone number etc of the specific user. There will not be any formatting for this field and will be stored in the database as received. This field will accept AN, "@", ".", "−" |

As shown in Table 1, the request message may comprise a header (e.g., an HTTP header) which may be utilized to ensure the following message is a valid request message. This verification may be performed locally at the application server 140 and/or in association with an additional authentication server. Moreover, the body of the request message may comprise a client identifier, which identifies the institution for which the user's account is associated. As a specific example, the client identifier specifies a user's financial institution with which the user's banking accounts are associated. Moreover, as specified in Table 1, the body of the request message further specifies an originator identifier that specifically identifies the mobile app 113 from which the request originates. In certain embodiments, this may be utilized for additional verification processes to ensure the request is valid and authorized. The request message may further specify a request type, indicating whether the request is associated with an account number, a PAN (e.g., associated with a user's physical debit card), or a v-PAN. The requestvalue field may provide identifying information of the type specified in the prior field. Thus, the requestvalue field may comprise the user's account number (and name in certain embodiments to ensure the provided data is unique), the user's PAN (and name in certain embodiments), and/or the user's v-PAN.

As specified in Table 1, the request further specifies the amount of a cash withdrawal request, as specified via user input received by the mobile app 113. As discussed herein, the cash request may be limited to a maximum cash request amount as specified in user-specific or v-PAN BIN-level specifications, and according the amount requested may be limited in accordance with the applicable maximum. In certain embodiments, the mobile app 113 may be configured to prevent users from submitting a request greater than the maximum (by providing an error message to the user and requesting the user to enter an amount less than the maximum) or the mobile app 113 may be configured to automatically adjust the request to the maximum value in embodiments in which the user requests greater than the maximum. As yet other embodiments, the mobile app 113 may not enforce the maximum (e.g., in embodiments in which the mobile app 113 does not have any locally stored data indicative of the maximum), and accordingly the mobile app 113 may transmit the user's requested amount, regardless of whether that amount is greater than the maximum. The application server 140 may then enforce the applicable maximum by either rejecting the access code request or adjusting the requested amount to be the maximum amount requested in instances in which the user requests greater than the applicable maximum request limit. As indicated in Table 1, the requested amount field may be utilized to distinguish a request for an access code from an eligibility check message transmitted from the mobile app server 120. As discussed therein, a requested amount of 0.00 may trigger the app server 140 to perform an eligibility check for the user and to provide an eligibility response message to the mobile app server 120 indicating whether the particular user is eligible for use of the CCS methodologies.

Moreover, the request message may specify an access code lifespan (e.g., in seconds) indicating the amount of time that the access code should be valid after generation. Access codes may thus be configured to expire after a predefined period of time, to provide additional security against unauthorized usage of the access codes. Like the amount requested, the access code lifespan may be subject to a user-level, v-PAN BIN-level, or banking-institution level limit which may be enforced by the mobile app 113 (e.g., which may specify an access code lifespan in when providing the request) or the application server 140. In the former embodiments, the mobile app 113 may be configured to prevent users from selecting a length of time greater than the applicable maximum (e.g., by providing an error message and requesting the user to enter a length of time less than the applicable maximum or by automatically adjusting the requested lifespan to the applicable maximum if a lifespan is requested that is greater than the applicable maximum). In the latter embodiments in which the lifespan limits are enforced by the application server 140, the application server may be configured to reject an access code request if the lifespan requested is greater than the applicable maximum, or the application server 140 may be configured to adjust the requested lifespan to match the applicable maximum in instances in which the requested lifespan is longer than the applicable maximum. In yet other embodiments, users may not be given the option to adjust the requested lifespan of the access code, and accordingly the mobile application server 120 (or the mobile app 113) may provide this value automatically as a part of the request message. Moreover, the requested lifespan field may be utilized to distinguish a request for an access code from an eligibility check message transmitted from the mobile app server 120. As discussed therein, a requested lifespan of 0 seconds may trigger the app server 140 to perform an eligibility check for the user and to provide a response message to the mobile app server 120 indicating whether the particular user is eligible for use of the CCS methodologies.

With reference again to Table 1, the request message may further specify a user name, which may be populated automatically by the mobile app 113 to enable exact matching of the user name, or which may be populated based at least in part on user input, in which case fuzzy matching logic may be utilized for verification of the user's name with the request. As mentioned above, the user's name may be included with an account number to provide an entirely unique account identifier to distinguish between users who may have joint access to a single account. Finally, the request message may, in certain embodiments, include an additional originator identifier further identifying the user based on a unique value. The originator identifier may be utilized for any of a variety of purposes, such as providing notifications to the user (if applicable), to further verify the user's identity, and/or the like.

In certain embodiments, the request message may specify whether a requested access code is to be subject to any usage restrictions. For example, a user 100 (via user input provided to the mobile app 113) or the mobile app 113 (via features not subject to user selection via user input) may specify whether a requested access code is to be restricted to usage for cash withdrawal via ATM systems 260 or Merchant/POS systems 250. As discussed herein, applicable restrictions on use for a particular access code may be stored at the application server 140 such that data indicative of a later-usage of the access code may be verified, or the applicable restrictions may be implemented based on the amount of data returned with the access code. For example, a restriction indicating that a particular access code may only be utilized via Merchant/POS systems 250 may be implemented based on data stored at the application server 140 for later verification, or the restriction may be implemented by providing the access code to the user's 100 mobile app 113, without generating a corresponding PIN. Accordingly, the user 100 will be unable to present the access code to an ATM system 260 because the user 100 does not have an associated PIN to be utilized with the access code, and/or any PIN provided by the user to the ATM system 260 will not be validated. Similarly, an access code restricted for use only with ATM systems 260 may have data stored in the application server 140 that may be used for transaction restriction validation, or the access code may be generated together with a PIN (or PIN offset), such that authorization of the access code may only be accomplished together with the authorized PIN, and in certain embodiments the PIN may only be provided for authorization via the user interface of an ATM system 260.

Based on the contents of the request message received at the application server 120, the application server 140 then may construct a v-PAN request which contains data from the access code & PIN request (which may comprise the account number) as shown at step/operation 509. For example, in instances in which the request message specifies a PAN or ACCOUNT requestType, the application server 120 may construct a v-PAN request to obtain the applicable v-PAN for a given request. The application server 140 then transmits the v-PAN request to the authorization server 170 as shown at step/operation 510. However, in instances in which the request message specifies a v-PAN requestType, the request itself may already contain the needed v-PAN, and a separate v-PAN request may be unnecessary. For clarity, the v-PAN of certain embodiments may be utilized to identify and/or verify access code requests, and the v-PAN may be unique to a particular user, but the v-PAN may remain entirely unknown to the user in certain instances. The v-PAN may thus be utilized for entirely internal reference purposes between the various servers discussed herein. In certain embodiments however, such as embodiments in which the CCS actions may be utilized to enable disbursements from an account to particular individuals not having an ownership interest in the account (e.g., providing disbursements from an insurance company account to benefits recipients, providing reward disbursements from a particular retailer's account to retailer loyalty members, and/or the like), a user may be provided with a v-PAN to be included in an access code request enabling withdrawal of the cash included in the disbursement.

In one embodiment as reflected at step/operation 511, the authorization server 170 retrieves the appropriate v-PAN and associated customer name(s) from its authorization server data repository 180 based on the received account number, and constructs a v-PAN response containing the v-PAN and customer name(s) associated with the v-PAN. In certain embodiments—particularly those in which an entirely unique account number or PAN may be utilized to identify a particular customer, a customer name(s) is not necessarily needed for ATM cash withdrawal but may be needed for Merchant/POS cash withdrawal as discussed herein. In one embodiment, the authorization server 170 transmits the v-PAN response to the application server 140 (shown at step/operation 512).

Figure 8:
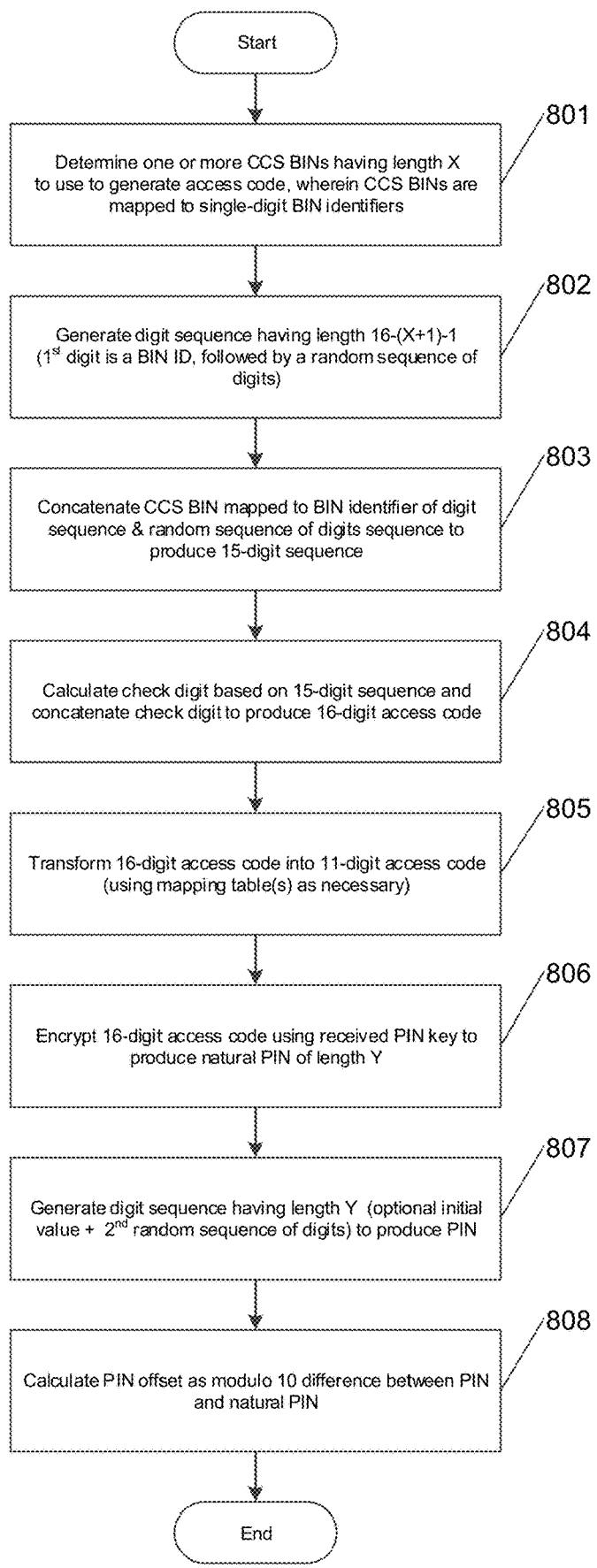

In one embodiment reflected at step/operation 513 and in more detail in FIGS. 8 and 10, the application server 140 generates a 16-digit access code consisting of a CCS BIN having length X from its application server data repository 150 followed by a unique sequence of digits having length (16-X) consisting of: a pseudo-randomly generated sequence of digits having length ((16-X)–1), or (15-X) and a final check digit for the entire 16-digit access code. In certain embodiments, the pseudo-randomly generated sequence of digits is generated utilizing an algorithm and a sequential index number tracking the number of access codes generated. The pseudo-randomly generated access code may be repeatably generated based on the sequential index number utilized as a seed value to generate the access code. In other words, using the same index number (e.g., "1" or "000234567") with the algorithm may repeatably generate the same pseudo-randomly generated access code, and each index number yields a different pseudo-randomly generated access code. In this way, the access codes are ensured to never repeat until all of the index numbers have been utilized. It should be understood that, prior to generating the access code, the application server 140 may perform a check to determine whether the user has exhausted a maximum number of access codes (e.g., a maximum number of access codes per day, per week, and/or the like, which may be established at the v-PAN BIN level and/or at the individual user/v-PAN level). Upon determining that the user has exhausted the maximum number of access codes permissible for generation, the application server 140 may stop the access code generation process, and may cause an error message to be displayed to the user via the mobile app 113.

FIG. 8 provides a detailed flowchart indicative of the various steps/operations involved in generating an access code according to certain embodiments. To begin, one or more CCS BINs having a given length (e.g., a length "X" as indicated in FIG. 8, which may be 6 digits in certain embodiments) are identified as eligible for use to generate the access code. In embodiments in which only a single CCS BIN is available for use in generating an access code (e.g., a single CCS BIN mapped to a particular v-PAN BIN, a single CCS BIN utilized for all access codes, and/or the like), the following methodology may be utilized for generating a random (or pseudo-random) number sequence having a length of 16-X-1 (or 15-X), and a check digit may then be determined and concatenated to form the complete 16-digit access code.

However, in embodiments in which a plurality of CCS BINs are available for use in generating an access code, the following methodology may be utilized for generating for generating a random (or pseudo-random) number sequence having a length of (16-X-1)+1 (or 16-X), wherein the first digit of the generated number sequence is embodied as a BIN identifier mapped to one of the available CCS BINs enabling expansion from the generated random (or pseudo-random) number sequence into a number sequence having a 15-digit length, and a check digit may then be determined and concatenated to form the complete 16-digit access code.

In one embodiment, the one or more available CCS BINs that are determined as eligible for use in generating the CCS access code must be selected from a plurality of defined and/or available CCS BINs, thereby enabling ATM machines (or other fund dispensing machines) to distinguish generated CCS access codes from other numbers (e.g., debit card numbers) based on the included CCS BIN in an access code. That is, the access code is recognizable as a CCS item (and thereby distinguishable from other numerical strings) that may be transformed appropriately (e.g., transformed from 11 to 16 digits as discussed herein), and routed appropriately.

The remaining portion of the access code, having a length 16-X+1 (X being the length of the CCS BIN; 16-digits being a traditional debit card or credit card length, thereby enabling the access code to be utilized with ATMs configured to accept 16 digit card numbers, although it should be understood that similar configurations may be utilized with access codes having lengths greater or less than 16 digits; and a leading digit of the remaining portion of the access code being a BIN identifier that is replaced by the CCS BIN upon expanding the access code from length 16-X+1 (or 11-digits in certain embodiments) to 16-digits) is generated according to an algorithm as represented in FIG. 10 and as indicated at step/operation 802 of FIG. 8. The remaining portion of the access code may encompass a randomly generated number and a single check-digit. The following concatenated example provides an illustration of the various portions of a 16-digit access code with a 6-digit CCS BIN according to various embodiments.

[6-digit CCS BIN] [9-digit pseudo-randomly generated number] [single check digit]

The algorithm represented in FIG. 10 is configured to generate pseudo-randomly generated numbers within a defined domain, and the defined domain may be equal to or less than the total number of values that may be represented based on the length of the pseudo-randomly generated number. With reference to the above access code, a 10-digit pseudo-randomly generated number may be configured to encompass numbers between the range of 0,000,000,000-9,999,999,999 or some subset thereof (e.g., the range of 0,000,000,000-3,999,999,999), and the leading digit is mapped to a particular 6-digit CCS BIN, as indicated in Table 2, below (with the exception of the leading digit, the remaining 9-digits of the pseudo-randomly generated number form a part of both a generated 16-digit access code (in which case the leading digit is replaced with the mapped CCS BIN) and an 11-digit access code (in which case the leading digit is included in the access code)). Thus, the domain of the pseudo-randomly generated number of the access code may encompass the entire range between 0,000,000,000-9,999,999,999 (and accordingly may be mapped to 10 different CCS BINs, based on the leading digit of the pseudo-randomly generated number), or some subset thereof (e.g., the range of 0,000,000,000-3,999,999,999, which may be mapped to 4 different CCS BINs, based on the leading digit of the pseudo-randomly generated number). In embodiments utilizing a subset of the entire range of available values (e.g., using less than 10 CCS BINs, such that only certain leading digits (e.g., 0-3) are indicated as acceptable outputs of the algorithm), the application server 140 may be configured to repeat the pseudo-random number generation process as needed until it generates a value within the defined subset of usable values, as discussed herein.

With reference to FIG. 10, the pseudo-randomly generated number is generated based on an index value stored within the application server 140 (or application server data repository 150). Each time an access code is generated, the index number is increased by one (e.g., the first access code is generated based on an index value of "1," the second access code is generated based on an index value of "2," the $100^{th}$ access code is generated based on an index value of "100," and so on). As shown in FIG. 10, the index number (shown in the left-most column) is converted to binary (as shown in the central column), and the binary digits are scrambled according to a known methodology and converted to a non-binary format, generating the integer value in the right-most "access code" column. In certain embodiments, the algorithm may track and/or utilize the number of attempts to generate an access code within a defined value range (e.g., having a leading value mapped to one of a plurality of available CCS BINs) to enable the algorithm to generate entirely repeatable access codes based on each index value generated; alternatively, the algorithm may be repeated using any pseudo-randomly generated numbers outside of a defined range as an index value input of the algorithm until a pseudo-randomly generated number is generated within the defined range. As yet another alternative, any index value that results in the generation of a pseudo-randomly generated number outside of a defined range may be disposed of The scrambled binary sequence is converted to non-binary format, thereby forming the pseudo-randomly generated number for use with the access code. In certain embodiments, the application server 140 compares the pseudo-randomly generated number against a range of available numbers for use as a portion of the access code. Upon determining that the generated number is within the usable range, the application server 140 constructs the entirety of the access code by looking-up the applicable CCS BIN mapped to the leading digit BIN identifier of the pseudo-randomly generated number, and replacing the leading digit BIN identifier with the identified CCS BIN as indicated at step 803 and calculating a check digit based on the compiled CCS BIN and remainder of the pseudo-randomly generated number as indicated at step 804; alternatively, upon determining that the pseudo-randomly generated number is outside of the available range, the application server 140 may apply a recursion methodology to obtain an access code within an available range. For example, the application server 140 may reapply the number generation algorithm utilizing the pseudo-randomly generated number as the index value (and increasing the number of attempts utilized, if applicable) until a usable number falling within the predefined range is generated. Thus, each index value corresponds to a single access code within a defined range.

In one embodiment, the access code must be unique over the entire domain of the application server 140 for at least some time period that exceeds the lifespan (finite duration) of access codes, as an access code must be able to unambiguously identify a v-PAN during subsequent cash withdrawal. In certain embodiments, the access codes must be cleared from the application server data repository 150 before they can be "reused." For example, as discussed above, the access codes may be pseudo-randomly generated based on an increasing index value used as a seed for the access code generation, such that access codes are not reused until all available access codes have been used once.

In one embodiment, the application server 140 transforms the generated 16-digit access code into an 11-digit access code as shown at step/operation 805 of FIG. 8, using mapping table(s) in its application server data repository 150 as necessary. An example mapping table is provided in Table 2, shown below. The 6-digit CCS BIN of the access code is converted back into the BIN identifier generated as the leading digit of the previously generated 10-digit number sequence (e.g., by removing the 6-digit CCS BIN from the 16-digit access code and replacing it with the mapped single-digit BIN identifier as indicated in the mapping table). For example, the CCS BIN values shown in the right-hand column of Table 2 are converted into the single-digit BIN identifiers shown in the left-hand column that are mapped to those CCS BINs, such that the leading digit of the 11-digit access code may be converted back into the multi-digit (e.g., 6-digit) CCS BIN as needed. The resulting 11-digit access code includes the 10-digit pseudo-randomly generated number (the leading digit of which is the BIN identifier) followed by the check digit, calculated using the CCS BIN and 9 remaining digits of the pseudo-randomly generated number after replacing the leading digit with the CCS BIN.

TABLE 2

| BIN Identifier | CCS BIN |
|---|---|
| 0 | 506984 |
| 1 | 506985 |
| 2 | 506986 |
| 3 | 506987 |
| 4 | 506988 |
| 5 | 506989 |
| 6 | 506990 |
| 7 | 506991 |
| 8 | 506992 |
| 9 | 506993 |

As shown at steps/operations 806-807 of FIG. 8, the application server 140 may, in certain embodiments, use the PIN key associated with the just-used CCS BIN from its application server data repository 150 to encrypt the 16-digit access code, yielding a "natural PIN" value of predetermined (e.g., 4 digits) length Y in certain embodiments. Then, the application server 140 randomly generates a numeric PIN value of the same length as the "natural PIN" (or of length (Y-Z) if a fixed, predetermined value having length Z is prepended before the random sequence to yield the PIN). Finally, the application server 140 calculates the "PIN offset" value as the modulo 10 difference between the PIN and the "natural PIN," as indicated at step/operation 808.

Alternatively, the application server 140 may obtain a PIN offset for existing PIN utilization based at least in part on a card (e.g., debit card) PAN record and PIN offset associated with the card account, for example, from the authorization server 170. The application server 140 transmits an existing PIN utilization or PIN generation request to the authorization server 170 including the access code, an indicator of whether the PIN (or PIN offset) is to be generated based on the PAN or v-PAN, the PAN or v-PAN, and the PIN-offset (if the authorization server 170 provided such data to the application server 140 with the v-PAN response, otherwise the authorization server 170 looks-up the PIN-offset based on the PAN or v-PAN upon receipt of the PIN generation request), as indicated at 514 of FIG. 5. As indicated at 515, the authorization server 170 generates a PIN and/or a PIN-offset for utilization of an existing PIN for the access code based on a PAN record and/or a v-PAN record associated with the requesting user based on the data included in the existing PIN utilization or PIN generation request. The authorization server 170 retrieves a PAN record associated with the requesting user (e.g., based on stored links between the v-PAN and debit card PAN, stored links between the debit card PAN and account identifiers (e.g., account numbers utilized to look-up the v-PAN, and/or the like), if necessary to obtain any of the PAN, the v-PAN, or the PIN offset. If there are multiple debit card PANs associated with the entered v-PAN or account identifier (e.g., account number), the authorization server 170 is configured to perform a name-match associated with the accounts to select a PAN for PIN selection and usage, or the authorization server 170 may be configured to select the first PAN identified for PIN selection and usage. As a part of the PAN record, the authorization server 170 obtains the PIN offset utilized for the user's PAN and associated PIN. The authorization server 170 then calculates a new PIN offset to be associated with the generated access code and the user's original PIN (e.g., the PIN associated with the user's PAN) based on the PIN offset utilized for the user's PAN. The authorization server 170 then transmits an existing PIN utilization or PIN generation response to the application server 140, as indicated at 516. The existing PIN utilization or PIN generation response may itself include the generated PIN offset, or it may simply provide a confirmation message that the PIN offset has been generated and is thus ready for later authorizing a transaction at the authorization server 170. In other embodiments, the application server 140 may be configured to generate a random-number PIN (not based on any access codes and/or PANs) without communication with the authorization server 170. As discussed herein, such random-number PINs may not be authenticated during later transactions, but may be provided to a user's 100 mobile app 113 for entry into a funds dispensing system (e.g., an ATM system 260).

The application server 140 (or the authorization server 170) may further define a number of PIN entry attempts (e.g., which increases each time the user attempts to enter a PIN) and a maximum number of PIN entry attempts to be utilized as security to prevent users from taking unlimited guesses to attempt to determine the PIN.

In particular usages, the application server 140 need not identify a PIN offset, and no PIN may be required for usage of an access code (e.g., for cash requests at a POS terminal in which an employee of the location operates the POS terminal and may verify the user's identity via alternative methodologies (e.g., photo identification verification).

In yet other embodiments, the application server 140 may generate a random PIN without generating a secure PIN offset to provide a simple identity verification when the access code and PIN are used. In such embodiments, the combination of the short, finite-duration access code, randomly generated PIN, and other information associated with the access code may be utilized in combination to verify the user of the access code (e.g., utilizing a withdrawal amount as an additional point of authentication by comparing the withdrawal amount provided with the access code request against the withdrawal amount requested when entered into a funds dispensing system).

current date-time or reflecting a future date-time at which the access code will expire); 6) an invalid PIN retry count (initialized to 0); 7) an eligibility for removal indicator (initialized to "no"); and/or the like. With reference again to FIG. 5, the application server 140 constructs an access code & PIN response that includes the 11-digit access code and the generated PIN; and the application server 140 transmits the access code & PIN response to the mobile app server 120 as indicated at 517. In one embodiment, the mobile app server 120 constructs a cash request response containing the received 11-digit access code and PIN, as shown at step/operation 518. The contents of an example access code & PIN response to the mobile app server 120 is shown in Table 3, below.

TABLE 3

| Field | Data Type | Comment |
|---|---|---|
| clientAuditId | String | Echoed from request message. |
| clientId | String | Echoed from request message. |
| originatorId | String | Echoed from request message. |
| requestType | String | Echoed from request message. |
| requestValue | String | Echoed from request message. |
| accountType | String | Echoed from request message. |
| amount | String | Amount authorized for access code may be provided in a minor currency unit, such as cents. (e.g., A value of 999999999999 in request implies $9999999999.99) In certain embodiments, if requested amount is less than the maximum amount, then the authorized amount is equal to the requested amount. If the requested amount is greater than the maximum amount, then the authorized amount may be equal to the maximum amount. The response may include the maximum amount if the request is deemed to be an eligibility check request. |
| accessCodeLifeSpan | String | Authorized lifespan of the access code in seconds In certain embodiments, if requested lifespan is less than the maximum lifespan, then the authorized lifespan is equal to the requested lifespan. If the requested lifespan is greater than the maximum lifespan, then the authorized lifespan may be equal to the maximum lifespan. |
| accessCodeMax | String | Returns a maximum number of access codes available. |
| activeAccessCodes | String | Returns the total number of active access codes in use. |
| accessCode | String | Unique 11 digit access code (may be equal to "00000000000" if the request is deemed to be an eligibility check request). |
| pinScheme | String | Provides an identifier indicative of the type of PIN-scheme utilized. For example, may indicate that the PIN-scheme utilized is a "True PAN" PIN scheme (e.g., the PIN is shared with the user's card PAN); a "vPAN" PIN scheme (e.g., the PIN is specific to the user's vPAN); a "Random" PIN Scheme (e.g., the PIN is a random number assigned to the particular access code); or a "NO PIN" indicating that no PIN is used. |

In one embodiment, the application server 140 stores the following data items in association with the v-PAN (in one embodiment, the v-PAN and customer name(s) may already be in the application server data repository 150 from a previous cash/access code request, in which case another set of the remaining data items is stored in association with the existing v-PAN) received from the authorization server 170 in its application server data repository 150: 1) the customer name(s) received from the authorization server 170; 2) the amount (e.g., requested withdrawal amount) received from the mobile app server 120; 3) the generated 16-digit access code; 4) the calculated PIN offset (or randomly generated PIN), if applicable; 5) a time stamp (either reflecting the As shown in Table 3, the response message includes a plurality of data fields comprising data echoed from the original response message, thereby enabling the mobile app server 120 (and/or the mobile app 113) to match the response message with the previously transmitted request. The response additionally comprises data identifying the authorized amount for the access code, indicative of the amount that may be withdrawn when using the particular access code (which may be equal to the original requested amount, or may be equal to a defined maximum amount in instances in which the requested amount exceeds the maximum amount) and the access code lifespan (which may be equal to the original requested lifespan, or may be equal to a defined maximum lifespan in instances in which the requested lifespan exceeds the maximum lifespan). The response may additionally comprise data indicative of the maximum number of access codes available to a particular user, as well as the total number of access codes that are active at the time the response message is returned. The response additionally comprises the generated 11-digit access code itself, as well as an indication of the type of PIN scheme utilized (if applicable). In certain embodiments, the pinScheme data may be echoed from a request message, and in such embodiments the mobile app 113 operating on the mobile device 110 may be configured to provide an indication of the type of PIN scheme utilized. Although not shown, the response message may additionally comprise a status indicator indicating whether the request was successfully processed, or whether an error state occurred that resulted in an unusable response message. This status indicator may be utilized by the mobile app server 120 to avoid unnecessary processing of incomplete or otherwise unusable response messages. Moreover, in instances in which the response message is embodied as an eligibility response message, the response message may comprise data indicative of the maximum withdrawal amount, a maximum lifespan, and/or the like. The eligibility response message additionally comprises a defined access code placeholder (e.g., "00000000000") that is recognizable by the mobile app server 120 as being indicative of the response message being embodied as an eligibility response message, such that an eligibility message may be transmitted to the mobile app 113 indicative of whether the CCS processes are available to the user. The mobile app server 120 may be configured to determine whether the eligibility response message indicates that the CCS processes are or are not available to the user based on the content of the "accessCodeMax" field, the "amount" field, the "accessCodeLifeSpan" field, and/or the like. Thus, the same API response formatting may be utilized for providing substantive access code responses to the mobile app server 120 and to provide eligibility response messages to the mobile app server 120.

Moreover, as discussed above, a generated access code may be subject to one or more usage restrictions (e.g., the access code may only be usable for withdrawals via an ATM system 260, or the access code may only be usable for withdrawals via a Merchant/POS system 250). In such embodiments, the response message may comprise data indicative of the applicable usage restrictions, thereby enabling a mobile app 113 to present the user 100 with information indicative of the usage restrictions.

In one embodiment, the mobile app server 120 transmits the cash request response to the mobile app 113 as shown at step/operation 519, however it should be understood that portions of the data included within the response message may be unused by the mobile app 113 and/or may be undisplayed by the mobile app 113. In one embodiment, the mobile app 113 displays the received 11-digit access code and PIN (if applicable) to the mobile app user 100 at step/operation 520 and as shown in the example screenshot of FIG. 15, along with instructions on how to perform a cash withdrawal using the access code and an associated PIN (if applicable). In certain embodiments, the mobile app 113 may additionally display the authorized amount for the access code, the authorized lifespan for the access code (which may be displayed as an active count-down indicating the amount of time remaining for the life of the access code), and/or other data included within the response (e.g., usage restrictions for the access code), however it should be understood that at least a portion of this data may remain undisplayed, thereby enabling the undisplayed data to be utilized as an additional authorization check on the user when requesting cash using the access code, as discussed herein. In one embodiment, the mobile app 113 could automatically access the debit network locator server 190 to obtain and display nearby CCS-capable locations, or could leave it to the CCS user 100 to invoke such functionality. In one embodiment, the mobile app user 100 has a finite (short) period of time to use these values at a CCS-capable location.

The application server 140 of certain embodiments is also configured to cancel or otherwise invalidate an access code in request to a trigger event (e.g., a request). While the short, finite-duration of usability of the access codes generally provides adequate security against undesirable usage of an access code, certain instances may warrant the usage of positive steps/operations for canceling an access code, thereby rendering it invalid prior to its natural expiration as defined by data associated with the vPAN and access code at the application server 140. Upon detection of an applicable trigger event (e.g., a request generated via the mobile app 113 in response to receipt of user input selecting an interactive user interface element displayable via the user interface of the mobile app 113), the application server 140 may update the vPAN record to render the access code invalid. For example, the application server 140 may update the time duration associated with the access code (e.g., such that the finite duration of the access code becomes expired). As yet another example, the application server 140 may add and/or update an invalid code indication to the v-PAN record to render the access code unusable.

Cash Withdrawal at ATM System

Operations and steps for one embodiment of a cash withdrawal at an ATM system 260 is described below and shown in FIGS. 6 and 9. Beginning at step/operation 601, the CCS-capable ATM system 260 of one embodiment presents an option on its home screen for the CCS user interaction. In one embodiment, the mobile app user 100 selects this option, then is prompted for and enters or selects the following data items (which are thereby received by the ATM system 260): 1) the 11-digit access code (received as a result of a cash request in mobile app 113); 2) PIN (received as a result of the cash request in mobile app 113, or as is already known to the user, for example, from usage with the user's debit card PAN); 3) account identifier (e.g., primary checking); 4) amount (may be required to be the same as that specified in the cash request in mobile app 113); and/or the like. In certain embodiments, certain of this data may be received from alternative data sources not requiring user input. For example, quick-withdrawal or fast-cash options may comprise a plurality of user-specified default parameters including, for example, a default withdrawal account, a default withdrawal amount, and/or the like. These quick-withdrawal or fast-cash configurations may be received at the ATM system 260 from an acquirer server 230 (e.g., based on data stored in an acquirer server data repository 240 or received, either directly or indirectly, from an authorization server and/or issuer server).

The ATM system 260 constructs a withdrawal request containing the above 4 data items. However, in certain embodiments (particularly those embodiments in which the PIN is embodied as a randomly-generated number), the withdrawal request may not include the PIN, in which case later transaction verification is performed according to PIN-less verification methodologies. In such embodiments, the PIN may be utilized for enforcing a usage restriction on an access code, if applicable. A PIN may be provided to the user 100 (e.g., a randomly generated PIN may be provided to the user 100) such that the user has a value to be provided to the ATM system 260 in response to a PIN-request prompt. By contrast, those access codes that are restricted for withdrawals via a Merchant/POS system 250 may not be associated with a PIN, and accordingly the user 100 may not have appropriate data to satisfy an ATM system's 260 PIN request prompt, thereby rendering those access codes unusable via an ATM system 260 and effectively limiting the usage of the access code to withdrawals performed via a Merchant/POS system 250 that does not require a PIN. Once the enforcement of the access code usage restriction is complete, the PIN may not be used further in certain embodiments, and later verification may be provided via PIN-less verification methodologies.

The ATM system 260 transmits the withdrawal request to the acquirer server 230 as shown at step/operation 602. In one embodiment, the acquirer server 230 uses mapping table data (an example of which is shown above at Table 2) in its acquirer server data repository 240 to transform the 11-digit access code into a corresponding 16-digit access code, and then uses the CCS BIN portion of the 16-digit access code and the authority list of debit network BINs in its acquirer server data repository 240 to confirm routing to the appropriate debit network (including authorization server 170) as shown at step/operation 603. In one embodiment, the acquirer server 230 then constructs a modified withdrawal request containing the 16-digit access code in place of the 11-digit access code. In other embodiments, the ATM system 260 is configured to transform the 11-digit access code into a corresponding 16-digit access code locally at the ATM system 260 utilizing locally stored mapping table data. The ATM system 260 then transmits the withdrawal request to the acquirer server 230, including the 16-digit access code, such that the authorization server 230 need not expand the access code prior to routing the withdrawal request to the appropriate debit network (including authorization server 170). In one embodiment, the acquirer server 230 transmits the modified withdrawal request to the authorization server 170 as shown at step/operation 604.

As shown at step/operation 605, the authorization server 170 constructs a withdrawal request which contains 1) the 16-digit access code, 2) the PIN block (if applicable), 3) the account identifier, and 4) the amount, as received in the modified withdrawal request. In certain embodiments, this is a simple pass-through function if the format and contents of the received modified withdrawal request and the generated withdrawal request are the same. In one embodiment, the authorization server 170 transmits the withdrawal request to the application server 140 as shown at step/operation 606.

As shown at step/operation 607, the application server 140 performs validation checks based on the information received in the withdrawal request. As a part of these validation checks, the application server 140 may verify any applicable usage restrictions (if applicable), for example based on data included within the withdrawal request (e.g., within header data indicating the source of the withdrawal request). However, it should be understood that other systems, such as the authorization server 170 may perform such usage restriction verifications based on data within the withdrawal request and/or data indicating the source of the withdrawal request, and data indicative of any usage restrictions (if applicable). Upon determining that the access code is not authorized for use via a ATM system 260, the application server 140 (or other computing entity, such as authorization server 170) may provide a denial response to the ATM system 260 (via acquirer server 230), and may terminate further processing. However, upon determining that the access code is authorized for usage via an ATM system 260, the application server 140 may continue verification methodologies as discussed herein. Other various validation checks are illustrated in greater detail in FIG. 9, and begins with a determination of whether the provided access code is found stored in the application server data repository 150. The access code may be compared in its 16-digit format, or the application server 140 may be configured to remove the check digit and replace the CCS BIN with the BIN identifier (thereby recreating the 10-digit pseudo-randomly generated number utilized to generate the access code) and to compare the resulting 10-digit number against 10-digit numbers stored in the application server data repository 150 and indicative of access codes in use. In the case of any failure, it constructs an appropriate withdrawal response that reflects validation denial. In the case of success, it constructs an authorization request to originate transaction authorization via the authorization server 170 to the issuer server 210. If the application server 140 cannot locate the 16-digit access code in its application server data repository 150, the application server 140 constructs an "invalid access code" denial response, as indicated at step/operation 906 of FIG. 9. If the application server 140 locates the 16-digit access code in its application server data repository 150 (as indicated at step/operation 902) and the application server 140 determines that the access code has expired as indicated at step/operation 903 (based on a comparison of the current date-time to the timestamp associated with the access code), the application server 140 constructs an "expired access code" denial response as shown at step/operation 904. The access code can no longer be used and is marked eligible for removal as shown at step/operation 905 (in certain embodiments, the application server 140 may remove the access code and its associated items from the application server data repository 150; alternatively, mass clean-up could be left to a periodic batch process that performs similar removal for all access codes marked eligible for removal as well as expired access codes). In certain embodiments, if the application server 140 determines that the access code is still active (i.e., not expired, as determined at step/operation 903), the application server 140 (or the authorization server 170) performs PIN validation as follows: first it retrieves the PIN key associated with the BIN portion of the access code in its application server data repository 150 (as shown at step/operation 907), and then it encrypts the 16-digit access code to generate a "natural PIN" value as shown at step/operation 908. As shown at step/operation 909 of FIG. 9, the application server 140 then retrieves the PIN offset associated with the access code in its application server data repository 150 and adds that (modulo 10) to the generated natural PIN value to generate a calculated PIN value as shown at step/operation 910. Finally, the application server 140 compares the calculated PIN value to the received PIN value as shown at step/operation 911. If the calculated PIN value does not match the received PIN value, the application server 140 constructs an "invalid PIN" denial response as shown at step/operation 917. The application server 140 then increments the invalid PIN retry count associated with the access code as shown at step/operation 918, and if the invalid PIN retry count has reached some predetermined limit (e.g., 3) as determined at step/operation 919, the access code can no longer be used and is marked eligible for removal as shown at step/operation 905. In embodiments in which PIN validation is performed by the authorization server 170, the application server 140 transmits the received PIN value, the received access code, and the PIN-offset stored for the access code to the authorization server 170 for validation as indicated at 608 of FIG. 6. The authorization server 170 validates the PIN (e.g., in accordance with the steps described above in reference to steps 907-911 and steps 917-918) as indicated at 609 of FIG. 6. Upon determining that the PIN is invalid, the authorization server 170 transmits a response to the application server 140 denying the authorization request as indicated at 610, and the authorization server 170 (e.g., indirectly) transmits a response to the ATM system 260 indicating that the PIN provided by the user 100 is incorrect. Alternatively, upon validating the PIN, the authorization server transmits a PIN validation response indicating that the PIN is valid to the application server 140, thereby enabling further processing of the transaction. The PIN validation request may be transmitted to the authorization server 170 separately as indicated in FIG. 6, or it may be transmitted to the authorization server 170 together with an authorization request as indicated at 611 of FIG. 6 and as discussed below. In yet other embodiments, the authorization server 170 may transmit the 16-digit access code and PIN block to the issuer server 210 for validation, and the authorization server 170 may then receive a response message from the issuer server 210 indicating whether the PIN has been validated.

If both the access code and the PIN are determined to be valid, the application server 140 proceeds to compare the received amount with the amount associated with the access code in its application server data repository 150 as shown at step/operation 912. If the amount values do not match during the comparison step/operation of step/operation 913, the application server 140 constructs an "invalid amount" denial response as shown at step/operation 920. The access code can no longer be used and is marked eligible for removal (again, as indicated at step/operation 905). In certain embodiments, the application server 140 may be configured for generating and transmitting a plurality of messages upon denying a withdrawal request. One of the plurality of denial messages may be any of the above-mentioned denial messages, and a second message may be provided to the authorization server 170 to be relayed to an issuer server 210 to inform the issuer server 210 that there a denied withdrawal attempt was made. After constructing any of the above denial responses, processing continues with step/operation 619 of FIG. 6. All responses include the 16-digit access code received in the withdrawal request and may additionally comprise the v-PAN. Otherwise, if the access code, PIN, and amount are all valid, the application server 140 constructs an authorization request which includes the v-PAN corresponding to the access code in the application server data repository 150 and the account identifier and amount from the received withdrawal request as indicated at step/operation 914 of FIG. 9. In one embodiment, the application server 140 transmits the authorization request to the authorization server 170, as shown at step/operation 611.

Figure 6:
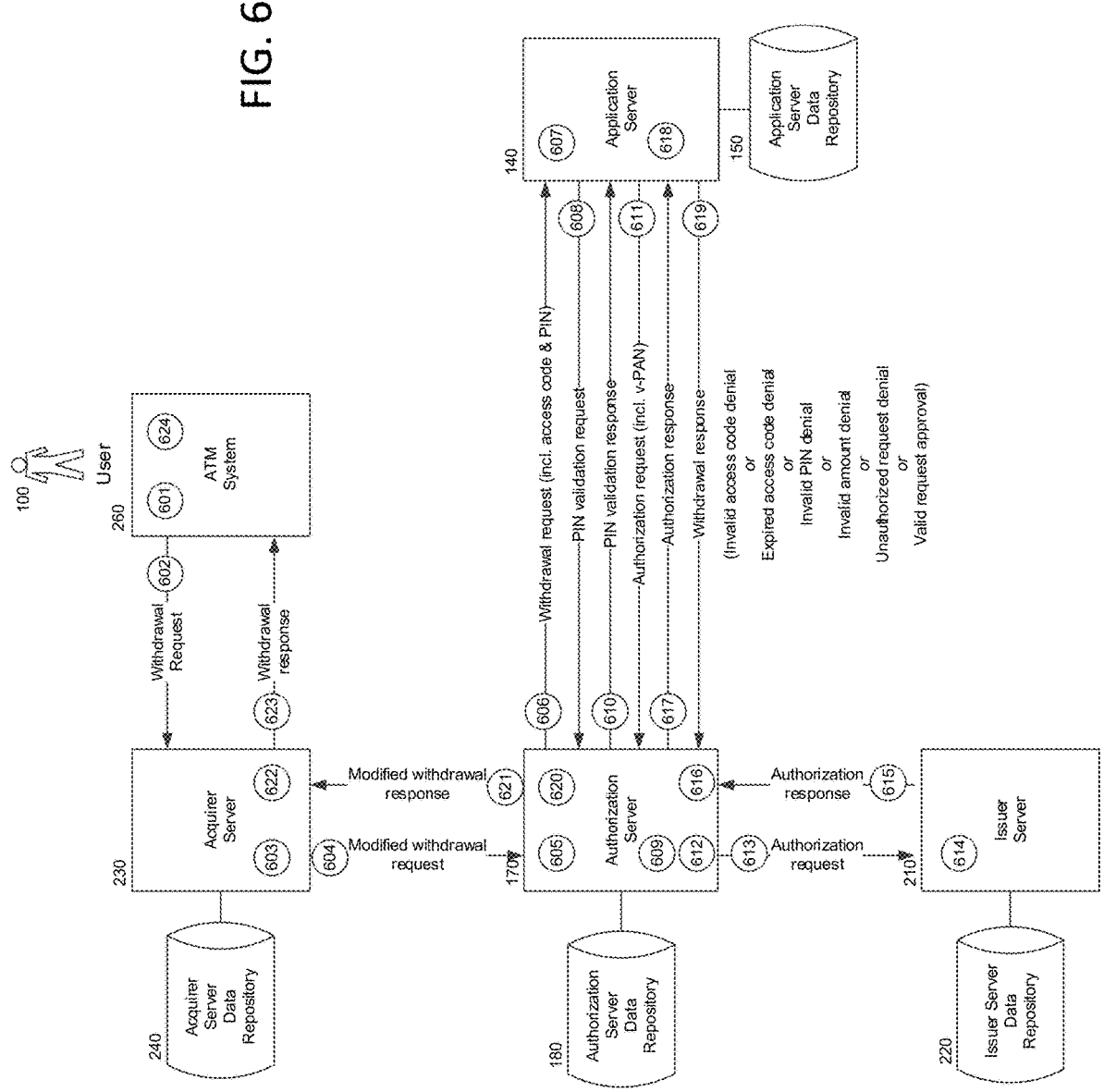
Figure 9:
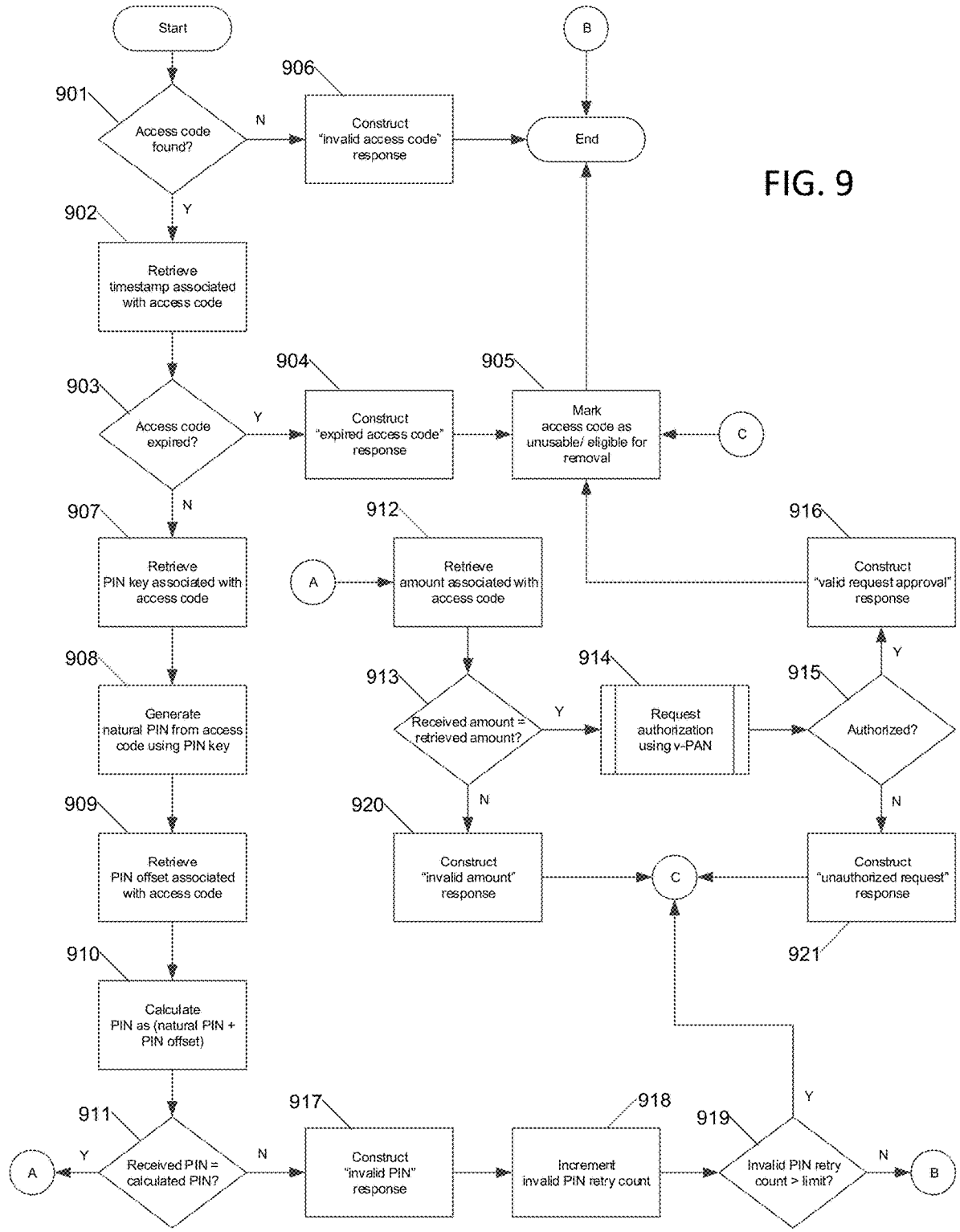
Figure 11:
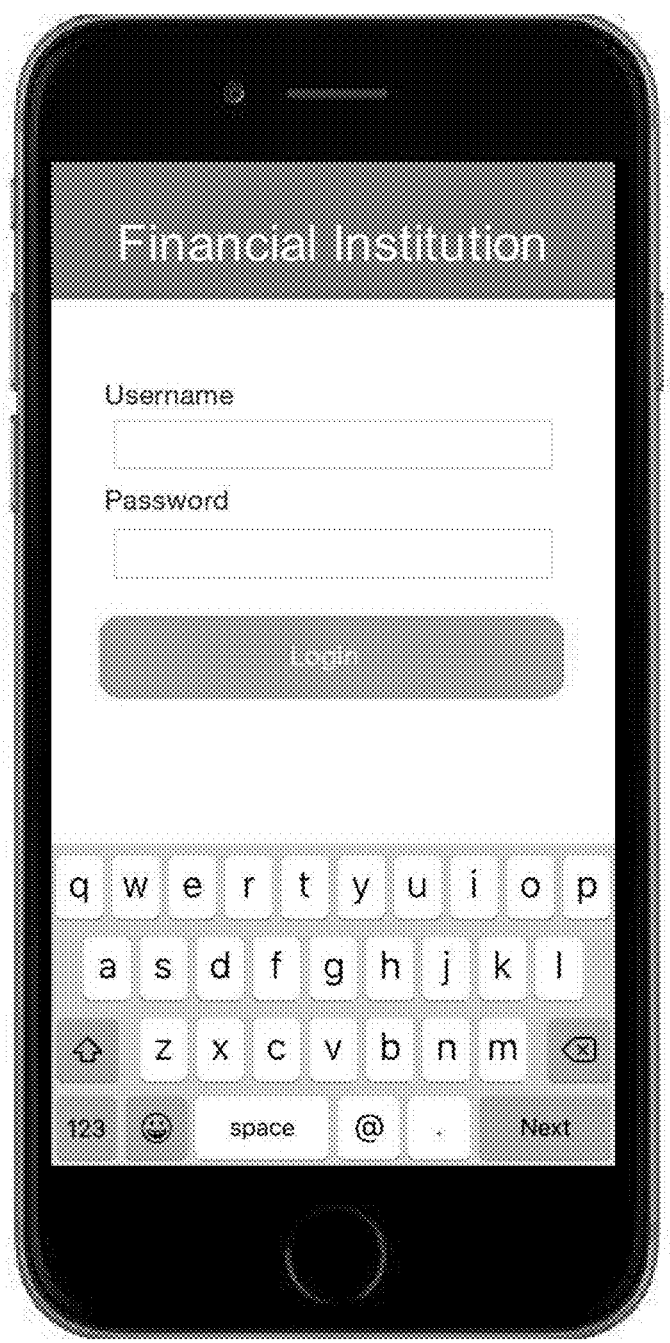
Figure 12:
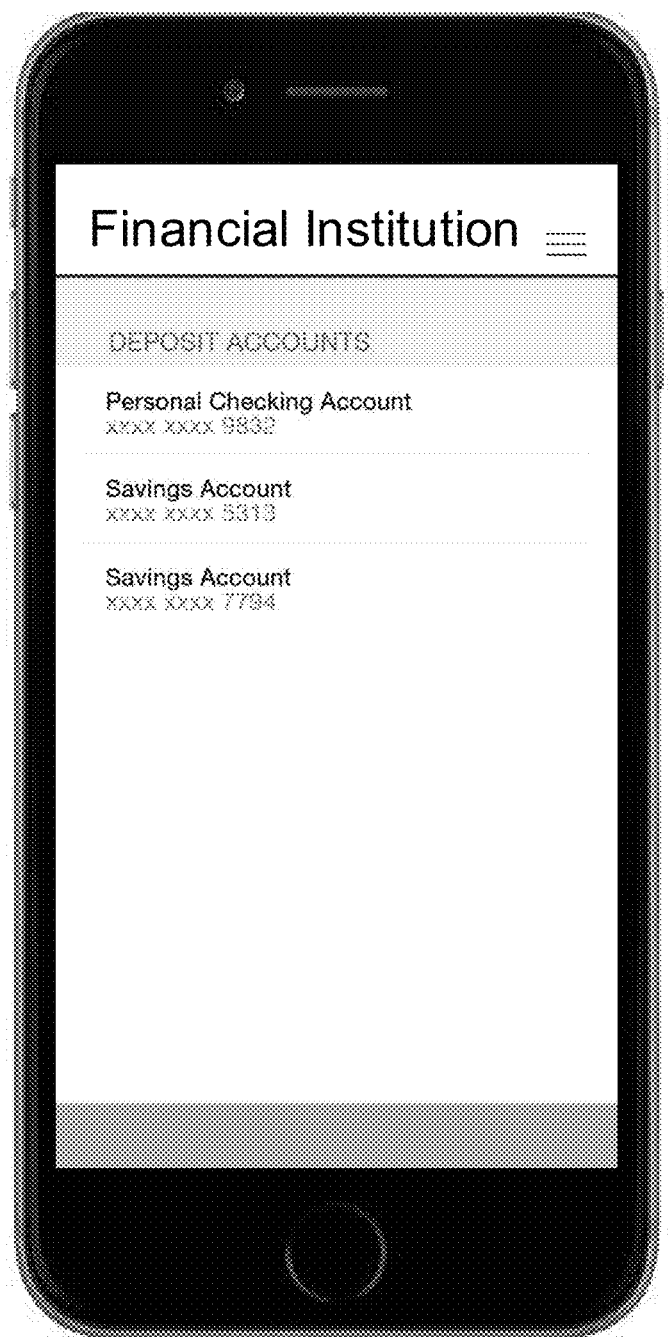

In one embodiment, the authorization server 170 uses v-PAN BIN-level and customer-level amount/funds and velocity limits, as present in its authorization data repository 180, to perform initial validation of the authorization request as shown at step/operation 612 of FIG. 6 (and as also reflected at step/operation 915 of FIG. 9). If this initial validation fails, the authorization server 170 constructs an appropriate authorization denial response as indicated at step/operation 921 of FIG. 9 and continues processing with step/operation 617. If the initial validation succeeds, the authorization server 170 constructs an authorization request as indicated at step/operation 916 of FIG. 9, containing the values (v-PAN, amount, an account identifier (e.g., the account identifier included in an initial withdrawal request and/or an account number provided (e.g., indirectly) from an issuer server 210)) received in the authorization request from the application server 140. In certain embodiments, this may be a simple pass-through function if the format and contents of the authorization request received from the application server 140 and the generated authorization request are the same. In one embodiment, the authorization server 170 transmits the authorization request to the issuer server 210 as shown at step/operation 613. In one embodiment, the issuer server 210 performs traditional authorization processing based on the received information (treating the v-PAN just like a regular card-based PAN), debits the identified account included in the authorization request to reflect the withdrawal request, and constructs an appropriate authorization response (shown at step/operation 614). In one embodiment, the issuer server 210 transmits the authorization response to the authorization server 170 (shown at step/operation 615). In other embodiments, the authorization server 170 may authorize a withdrawal request based on the received information (e.g., without communicating with an issuer server 210, for example, after determining that the issuer server 210 is offline or otherwise inaccessible via a network 280) utilizing authorization processing methodologies as discussed above. In one embodiment, the authorization server 170 generates an authorization response based on the received authorization response. This may be a simple pass-through function if the format and contents of the authorization response received from the issuer server 210 and the generated authorization response are the same (as shown at step/operation 616). In one embodiment, the authorization server 170 transmits the authorization response to the application server 140, as shown at step/operation 614.

In one embodiment, the application server 140 generates a withdrawal response based on the received authorization response as reflected at step/operation 618. If the received authorization response indicates the transaction was not authorized, the application server 140 constructs an "unauthorized request" denial response. Otherwise it constructs a "valid request approval" response. All responses include the 16-digit access code received in the withdrawal request. The access code can no longer be used and is marked eligible for removal. In one embodiment, the application server 140 transmits the withdrawal response to the authorization server 170, as shown at step/operation 616. In one embodiment, the authorization server 170 constructs an appropriate modified withdrawal response based on the withdrawal response received from the application server 140 (as shown at step/operation 620). This could be a simple pass-through function if the format and contents of the received withdrawal response and the generated modified withdrawal response are the same. In one embodiment, the authorization server 170 transmits the modified withdrawal response to the acquirer server 230, as shown at step/operation 621.

In one embodiment, the acquirer server 230 constructs an appropriate withdrawal response based on the modified withdrawal response received from the authorization server 170, as shown at step/operation 622. If the access code must be provided back to the ATM system 260, the acquirer server 230 transmits the received 16-digit access code to the ATM system 260, which may convert the 16-digit access code into the 11-digit access code received in the original withdrawal request, using the mapping table data stored locally at the ATM system 260, if needed. In one embodiment, the acquirer server 230 transmits the withdrawal response to the ATM system 260, as shown at step/operation 623. In one embodiment, the ATM system 260 displays an appropriate denial message if the withdrawal response contains a denial, or dispenses the appropriate amount of cash and provides a receipt if the withdrawal response contains a withdrawal authorization approval. Afterwards, the ATM system 260 returns the display to a default home screen, as shown at step/operation 624.

Withdrawal at Merchant POS System

Figure 7:
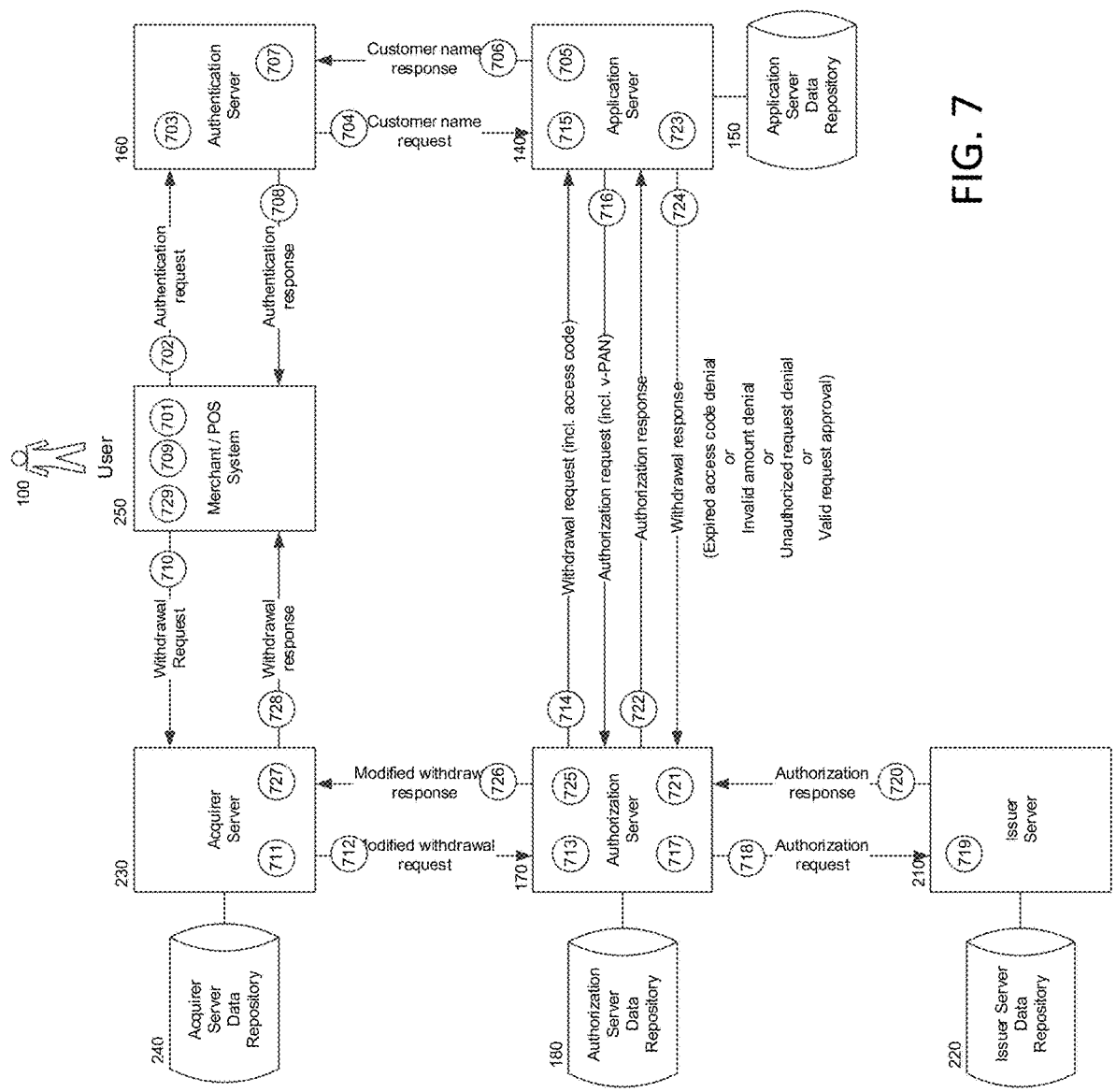

Operations and steps for cash withdrawal at a merchant POS system 250 according to one embodiment are described below and shown in FIG. 7. In one embodiment, the mobile app user 100 indicates to a merchant/POS employee that she wants to perform a CCS cash withdrawal, as shown at step/operation 701. In one embodiment, the mobile app user 100 is then queried for and provides two data items. In certain embodiments, unlike the cash withdrawal at ATM scenario, the mobile app user 100 may not be required to provide either a PIN or an account identifier (this implies that the withdrawal will be from a default account (similar to what may be done at an ATM with a quick-withdrawal or fast cash withdrawal)): 11-digit access code (received as a result of a cash request in mobile app 113) and amount (may be required to match the amount specified in the cash request in mobile app 113). In some scenarios, the mobile app user 100 provides this information to the merchant/POS employee, who is operating a user interface of the merchant POS system 250. In other scenarios, the mobile app user 100 operates the user interface of the merchant POS system 250 herself. In yet other scenarios, the operation of the merchant POS system 250 user interface is performed jointly by the merchant/POS employee and the mobile app user 100. In certain embodiments, the POS system 250 utilizes a mapping table stored locally thereon to transform the received 11-digit access code into a 16-digit access code. In one embodiment, the merchant POS system 250 constructs an authentication request containing the 16-digit access code (or the 11-digit access code if the transformation to the 16-digit access code is performed at the authentication server 160 or the application server 140) received from or on behalf of the mobile app user 100. In one embodiment, the merchant POS system 250 transmits the authentication request to the authentication server 160, as shown at step/operation 702.

In one embodiment, the authentication server 160 first executes a check digit validation algorithm on the received 16-digit access code (shown at step/operation 703). If check digit validation fails, the authentication server 160 constructs an authentication response containing indication of failure and continues processing with step/operation 708. Otherwise, the authentication server 160 constructs a customer name request containing the 16-digit access code. In one embodiment, the authentication server 160 transmits the customer name request to the application server 140, as shown at step/operation 704.

In embodiments in which the application server 140 performs the 11-digit to 16-digit access code transformation, the application server 140 retrieves appropriate mapping table data from its application server data repository 150 and uses the mapping table data to transform the 11-digit access code into a corresponding 16-digit access code, as shown at step/operation 705. Then, the application server 140 determines if the full 16-digit access code is present in its application server data repository 150. If it is not present, the application server 140 constructs an "invalid access code" customer name response. Otherwise, the application server 140 constructs a customer name response containing the 16-digit access code and the customer name(s) associated with the access code in its application server data repository 150. In one embodiment, the application server 140 transmits the customer name response to the authentication server 160, as shown at step/operation 706. In one embodiment, the authentication server 160 constructs an authentication response containing the 16-digit access code and the customer name(s) in the customer name response (or, alternatively, some indication of failure), as shown at step/operation 707. This could be a simple pass-through function if the format and contents of the received customer name response and the generated authentication response are the same. In one embodiment, the authentication server 160 transmits the authentication response to the merchant POS system 250 (shown at step/operation 708). In certain embodiments, the application server 140 may verify any applicable usage restrictions (if applicable), for example based on data included within the withdrawal request (e.g., within header data indicating the source of the withdrawal request) to ensure the access code is valid for use in withdrawal transactions performed via a Merchant/POS system 250. However, it should be understood that other systems, such as the authorization server 170 may perform such usage restriction verifications based on data within the withdrawal request and/or data indicating the source of the withdrawal request, and data indicative of any usage restrictions (if applicable). Upon determining that the access code is not authorized for use via a Merchant/POS system 250, the application server 140 (or other computing entity, such as authorization server 170) may provide a denial response to the Merchant/POS system 250 (via acquirer server 230), and may terminate further processing. However, upon determining that the access code is authorized for usage via a Merchant/POS system 250, the application server 140 may continue verification methodologies as discussed herein.

In one embodiment, the merchant POS system 250 requests that the mobile app user 100 present valid photo identification (e.g., a driver's license) that includes the mobile app user 100's name, as shown at step/operation 709. Whether that identification is visually inspected by a merchant/POS employee and a name in the identification is mentally compared to a merchant POS system 250 display of the received customer name(s), an image of the identification is captured and a name is extracted therefrom for automated comparison against the received customer name(s), or some other approach is used to compare a name in the identification to the received customer name(s), a comparison result is captured within the merchant POS system 250. If the comparison result indicates failure to match, processing ends. Otherwise, the merchant POS system 250 constructs a PIN-less withdrawal request (which may be constructed at the POS system 250 as a purchase with a cash back request in which the purchase amount is $0) containing the 16-digit access code received from the authentication server 160 and the amount received from or on behalf of the mobile app user 100. In one embodiment, the merchant POS system 250 transmits the withdrawal request to the acquirer server 230 (shown at step/operation 710). In one embodiment, the acquirer server 230 constructs a modified withdrawal request containing the 16-digit access code and the amount, as shown at step/operation 711. This could be a simple pass-through function if the format and contents of the received withdrawal request and the generated modified withdrawal request are the same. In one embodiment, the acquirer server 230 transmits the modified withdrawal request to the authorization server 170, as shown at step/operation 712.

In one embodiment, the authorization server 170 constructs a withdrawal request containing the 16-digit access code and the amount, as shown at step/operation 713. This could be a simple pass-through function if the format and contents of the received modified withdrawal request and the generated withdrawal request are the same. In one embodiment, the authorization server 170 transmits the withdrawal request to the application server 140, as shown at step/operation 714.

In one embodiment, the application server 140 performs validation checks based on the information received in the withdrawal request, as shown at step/operation 715 (in certain embodiments, these validation checks may be similar to those described above in reference to FIG. 9). In the case of any failure, it constructs an appropriate withdrawal response that reflects validation denial. In the case of success, it constructs an authorization request to originate transaction authorization via the authorization server 170 to the issuer server 210. Because of the prior authentication performed through the authentication server 160, the application server 140 may be assured that the access code will be found in the application server data repository 150. No PIN validation is performed since no PIN is used in this alternative. If the access code has expired (based on a comparison of the current date-time to the timestamp associated with the access code), the application server 140 constructs an "expired access code" denial response. The access code can no longer be used and is marked eligible for removal. In certain embodiments, the access code and its associated items may be removed from the application server data repository 150. Alternatively, mass clean-up could be left to a periodic batch process that performs similar removal for all access codes marked eligible for removal as well as expired access codes. If the access code is determined to be active, the application server 140 proceeds to compare the received amount with the amount associated with the access code in its application server data repository 150. If the amount values do not match, the application server 140 constructs an "invalid amount" denial response. The access code can no longer be used and is marked eligible for removal. In one embodiment, after constructing any of the above denial responses, processing continues with step/operation 24. Otherwise, if the access code is active and the amount is valid, the application server 140 constructs a PIN-less authorization request which includes the v-PAN corresponding to the access code in the application server data repository, and the amount from the received withdrawal request. In one embodiment, the application server 140 transmits the authorization request to the authorization server 170, as shown at step/operation 716.

In one embodiment, the authorization server 170 uses v-PAN BIN-level and customer-level amount/funds and velocity limits, as present in its authorization data repository 180, to perform initial validation of the authorization request (indicated at step/operation 717). If this initial validation fails, the authorization server 170 constructs an appropriate authorization denial response and continues processing with step/operation 722. If the initial validation succeeds, the authorization server 170 constructs an authorization request containing the values (v-PAN and amount) received in the authorization request from the application server 140. This could be a simple pass-through function if the format and contents of the authorization request received from the application server 140 and the generated authorization request are the same. In one embodiment, the authorization server 170 transmits the authorization request to the issuer server 210, as shown at step/operation 718. Continuing to step/operation 719, the issuer server 210 of one embodiment performs traditional authorization processing based on the received information (treating the v-PAN just like a regular card-based PAN), assuming or identifying a default account (may be a standard default account type or may be based on a pre-established user preference), and constructs an appropriate authorization response. Moreover, the issuer server 210 debits the identified account included in the authorization request to reflect the withdrawal request. In other embodiments, the authorization server 170 may authorize a withdrawal request based on the received information (e.g., without communicating with an issuer server 210, for example, after determining that the issuer server 210 is offline or otherwise inaccessible via a network 280) utilizing authorization processing methodologies as discussed above. In one embodiment, the issuer server 210 transmits the authorization response to the authorization server 170 as shown at step/operation 720. In one embodiment, the authorization server 170 generates an authorization response based on the received authorization response as shown at step/operation 721. This could be a simple pass-through function if the format and contents of the authorization response received from the issuer server 210 and the generated authorization response are the same. In one embodiment, the authorization server 170 transmits the authorization response to the application server 140 (shown at step/operation 722). In one embodiment, the application server 140 generates a withdrawal response based on the received authorization response, as shown at step/operation 723. If the received authorization response indicates the transaction was not authorized, the application server 140 constructs an "unauthorized request" denial response. Otherwise it constructs a "valid request approval" response. The access code can no longer be used and is marked eligible for removal. In one embodiment, the application server 140 transmits the withdrawal response to the authorization server 170 (shown at step/operation 724).

In one embodiment, the authorization server 170 constructs an appropriate modified withdrawal response based on the authorization response received from the issuer server 210, as shown at step/operation 725. This could be a simple pass-through function if the format and contents of the received authorization response and the generated modified withdrawal response are the same. In one embodiment, the authorization server 170 transmits the modified withdrawal response to the acquirer server 230 (as shown at step/operation 726). In one embodiment, the acquirer server 230 constructs an appropriate withdrawal response based on the modified withdrawal response received from the authorization server 170 as shown at step/operation 727. This could be a simple pass-through function if the format and contents of the received modified withdrawal response and the generated withdrawal response are the same. In one embodiment, the acquirer server 230 transmits the withdrawal response to the merchant POS system 250 (as shown at step/operation 728). In one embodiment, the merchant POS system 250 displays an appropriate denial message if the withdrawal response contains a denial, or directs dispensing the appropriate amount of cash and generating a receipt if the withdrawal response contains a withdrawal authorization approval. Afterwards, the merchant POS system 250 returns the display to a default home screen, as reflected in step/operation 729.

V. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

As noted above, the systems and methods discussed above may be utilized in association with non-financial institutions for providing cash withdrawal and distribution options. For example, a non-financial institution may utilize access codes to enable customers or other payees to retrieve cash from an account associated with the non-financial institution. In such embodiments, the non-financial institution may disseminate access codes and/or PINs (which may have a finite duration of several hours, days, weeks, and/or the like) to particular individuals, and those access codes may be associated with predefined withdrawal amounts, corresponding to an amount of money owed to the individual by the non-financial institution. Similarly, individuals may provide access codes and PINs to other individuals to enable person-to-person payments in which the payor enables the payee to withdrawal a predefined amount of cash from an account associated with the payor. Such configurations enable easy cash payments direct from an account associated with a payor, without risking more general access to the payor's account by the payee. In yet other embodiments, the systems and methods discussed above may be utilized for transferring funds in association with purchases of goods and/or services (e.g., via online, e-commerce, or in person transactions) in which an individual may provide an access code to a retailer/seller to obtain funds for the transaction.

That which is claimed:

1. A computer-implemented method of conducting a cardless cash transaction with a financial account, the method comprising:
   receiving, by the application server from a mobile device, an access code request associated with the user;
   retrieving, by the application server, from a memory accessible by the application server, a virtual Personal Account Number (v-PAN) for the user;
   generating, by the application server, an access code by:
      pseudo-randomly generating a value based at least in part on an increasing index value stored in association with the application server, wherein the index value increases after each pseudo-randomly generated value is generated;
      identifying, based on a leading digit of the pseudo-randomly generated value, a BIN value having length X;
      replacing the leading digit of the pseudo-randomly generated value with the BIN value to generate an intermediate value; and
      calculating a check digit and concatenating the check digit to the intermediate value to generate the access code, wherein the access code is valid for a defined finite duration;
   storing, by the application server, at least a portion of the access code and a timestamp associated with the defined finite duration of the access code in association with the v-PAN in the memory;
   transmitting, by the application server to the mobile device, data representing the access code for presentation to the user via the mobile app;
   receiving, by the mobile device from the application server, the data representing the access code;
   visibly displaying, by the mobile app generating a display on a visual display of the mobile device, a representation of the data representing the access code, wherein data representing the access code is configured for provision to a point-of-sale (POS) system to cause the POS system to request validation of the access code and to enable cash dispensing from the POS system and to debit a financial account associated with a financial institution;
   receiving, by the application server, a withdrawal request generated at the POS system on behalf of the user, wherein the withdrawal request comprises the data representing the access code;
   in response to receiving the withdrawal request, validating, by the application server, the withdrawal request based at least in part on the data representing the access code received as a part of the withdrawal request;
   upon validating the withdrawal request, initiating, by the application server, transmission of validation data for delivery to the POS system, wherein the validation data is configured to enable cash dispensing from the POS system; and
   upon receipt of the validation data at the POS system, enabling cash dispensing from the POS system on behalf of the user.

2. The computer-implemented method of claim 1, wherein validating the withdrawal request comprises verifying that the withdrawal request satisfies one or more usage restrictions.

3. The computer-implemented method of claim 1, wherein generating a withdrawal request at the POS system on behalf of the user is responsive to processing a purchase with a cash back request comprising the access code.

4. The computer-implemented method of claim 1, wherein the access code request comprises institution identifying data identifying a financial institution, user identifying data identifying the user, and financial account identifying data identifying the financial account associated with the financial institution.

5. The computer-implemented method of claim 4, wherein the financial account identifying data comprises an account identifier identifying the financial account for cash withdrawal.

6. The computer-implemented method of claim 4, wherein validating the withdrawal request comprises:
   transmitting, by the application server, an authorization request to an authorization server in communication with an issuer server associated with the financial institution; and
   receiving, by the application server, an authorization response indicating that the issuer server authorized access to the financial account on behalf of the user.

7. The computer-implemented method of claim 1, wherein the access code is a 16-digit access code and wherein the BIN value has a 6-digit length, and wherein generating an access code further comprises:
   replacing, by the application server, the BIN value with the leading digit of the pseudo-randomly generated value to create an 11-digit access code consisting of the pseudo-randomly generated value and the check digit; and
   wherein transmitting data representing the access code for presentation to the user via the mobile app on the mobile device associated with the user comprises transmitting the 11-digit access code for presentation to the user via the mobile app on the mobile device associated with the user.

8. The computer-implemented method of claim 1, wherein the withdrawal request further comprises a withdrawal amount, and wherein validating the withdrawal request comprises determining whether the withdrawal amount included in the withdrawal request matches a stored withdrawal amount associated with the access code.

9. The computer-implemented method of claim 1, wherein validating the withdrawal request comprises determining whether the access code has expired based at least in part on the stored timestamp.

10. The computer-implemented method of claim 1, wherein retrieving the v-PAN comprises querying a separate server to identify a v-PAN matching at least one element of the access code request.

11. A system for conducting a cardless cash transaction with a financial account, the system comprising:
   at least one mobile device executing a mobile app;
   at least one point-of-sale (POS) system; and
   an application server comprising:
      one or more memory storage areas; and
      one or more processors;
   wherein the at least one mobile device, the at least one POS system, and the application server are collectively configured to:
   receive, by the application server from a mobile device, an access code request associated with the user;
   retrieve, by the application server from the memory storage area, a virtual Personal Account Number (v-PAN) for the user;
   generate, by the application server, an access code by:
      pseudo-randomly generating a value based at least in part on an increasing index value stored in association with the application server, wherein the index value increases after each pseudo-randomly generated value is generated;
      identifying, based on a leading digit of the pseudo-randomly generated value, a BIN value having length X;
      replacing the leading digit of the pseudo-randomly generated value with the BIN value to generate an intermediate value; and
      calculating a check digit and concatenating the check digit to the intermediate value to generate the access code, wherein the access code is valid for a defined finite duration;
   store, by the application server, at least a portion of the access code and a timestamp determinative of the defined finite duration of the access code in association with the v-PAN in the memory;
   transmit, by the application server to the mobile device, data representing the access code for presentation to the user via the mobile app on the mobile device associated with the user;
   receive, by the mobile device from the application server, the data representing the access code;
   visibly display, by the mobile app generating a display on a visual display of the mobile device, a representation of the data representing the access code, wherein the data representing the access code is configured for provision to the POS system to cause the POS system to request validation of the access code and to enable cash dispensing from the POS system and to debit a financial account associated with a financial institution;
   receive, by the application server, a withdrawal request generated at the POS system on behalf of the user, wherein the withdrawal request comprises the data representing the access code;
   in response to receiving the withdrawal request, validate, by the application server, the withdrawal request based at least in part on the data representing the access code received as a part of the withdrawal request;
   upon validating the withdrawal request, initiate, by the application server, transmission of validation data for delivery to the POS system, wherein the validation data is configured to enable cash dispensing from the POS system; and
   upon receipt of the validation data at the POS system, enable cash dispensing from the POS system on behalf of the user.

12. The system of claim 11, wherein validating the withdrawal request comprises verifying that the withdrawal request satisfies one or more usage restrictions.

13. The system of claim 11, wherein generating a withdrawal request at the POS system on behalf of the user is responsive to processing a purchase with a cash back request comprising the access code.

14. The system of claim 11, wherein the access code request comprises institution identifying data identifying a financial institution, user identifying data identifying the user, and financial account identifying data identifying the financial account associated with the financial institution.

15. The system of claim 14, wherein the financial account identifying data comprises an account identifier identifying the financial account for cash withdrawal.

16. The system of claim 14, wherein validating the withdrawal request comprises:
   transmitting, by the application server, an authorization request to an authorization server in communication with an issuer server associated with the financial institution; and
   receiving, by the application server, an authorization response indicating that the issuer server authorized access to the financial account on behalf of the user.

17. The system of claim 11, wherein the access code is a 16-digit access code and wherein the BIN value has a 6-digit length, and wherein generating an access code further comprises:
   replacing, by the application server, the BIN value with the leading digit of the pseudo-randomly generated value to create an 11-digit access code consisting of the pseudo-randomly generated value and the check digit; and
   wherein transmitting data representing the access code for presentation to the user via the mobile app on the mobile device associated with the user comprises transmitting the 11-digit access code for presentation to the user via the mobile app on the mobile device associated with the user.

18. The system of claim 11, wherein the withdrawal request further comprises a withdrawal amount, and wherein validating the withdrawal request comprises determining whether the withdrawal amount included in the withdrawal request matches a stored withdrawal amount associated with the access code.

19. The system of claim 11, wherein validating the withdrawal request comprises determining whether the access code has expired based at least in part on the stored timestamp.

20. The system of claim 11, wherein retrieving the v-PAN comprises querying a separate server to identify a v-PAN matching the access code request.

21. A computer program product comprising a plurality of non-transitory computer-readable storage media each having computer-executable program code portions stored therein, the computer-executable program code portions comprising program code instructions, the computer program code instructions, when executed by a processor of a computing entity, are configured to cause the computing entity to at least:

receive, by the application server from a mobile device, an access code request associated with the user;

retrieve, by the application server from the memory storage area, a virtual Personal Account Number (v-PAN) for the user;

generate by the application server, an access code by:
- pseudo-randomly generating a value based at least in part on an increasing index value stored in association with the application server, wherein the index value increases after each pseudo-randomly generated value is generated;
- identifying, based on a leading digit of the pseudo-randomly generated value, a BIN value having length X;
- replacing the leading digit of the pseudo-randomly generated value with the BIN value to generate an intermediate value; and
- calculating a check digit and concatenating the check digit to the intermediate value to generate the access code, wherein the access code is valid for a defined finite duration;

store, by the application server, at least a portion of the access code and a timestamp determinative of the defined finite duration of the access code in association with the v-PAN in the memory;

transmit, by the application server to the mobile device, data representing the access code for presentation to the user via the mobile app;

receive, by the mobile device from the application server, the data representing the access code;

visibly display, by the mobile app generating a display on a visual display of the mobile device, a representation of the data representing the access code, wherein the data representing the access code is configured for provision to a point-of-sale (POS) system to cause the POS system to request validation of the access code and to enable cash dispensing from the POS system and to debit a financial account associated with a financial institution;

receive, at the application server, a withdrawal request generated at the POS system on behalf of the user, wherein the withdrawal request comprises the data representing the access code;

in response to receiving the withdrawal request, validate, by the application server, the withdrawal request based at least in part on the data representing the access code received as a part of the withdrawal request;

upon validating the withdrawal request, initiate, by the application server, transmission of validation data for delivery to the POS system, wherein the validation data is configured to enable cash dispensing from the POS system; and upon receipt of the validation data at the POS system, enable cash dispensing from the POS system on behalf of the user.

* * * * *